(12) United States Patent
Able et al.

(10) Patent No.: US 6,175,375 B1
(45) Date of Patent: Jan. 16, 2001

(54) METHOD AND APPARATUS FOR COMPENSATING FOR A DARKNESS SHIFT DURING THE LIFE OF AN ELECTROPHOTOGRAPHIC PRINTER CARTRIDGE

(75) Inventors: Douglas Anthony Able, Shelbyville; Cyrus Bradford Clarke, Lexington; Mark Edwin Kirtley Lund, Lexington; Daniel George Mlejnek, Lexington; George Peter Olson, Lexington; Gregory Lawrence Ream, Lexington; Thomas Campbell Wade, Lexington, all of KY (US)

(73) Assignee: Lexmark International, Inc., Lexington, KY (US)

(*) Notice: Under 35 U.S.C. 154(b), the term of this patent shall be extended for 0 days.

(21) Appl. No.: 09/491,323

(22) Filed: Jan. 25, 2000

(51) Int. Cl.$^7$ .................................................... G03G 15/00
(52) U.S. Cl. ............................................. 347/132; 399/43
(58) Field of Search .................................. 399/15, 24, 25, 399/26, 27, 43, 46, 50, 51; 347/132, 133

(56) References Cited

U.S. PATENT DOCUMENTS

| | | | |
|---|---|---|---|
| 3,575,505 | 4/1971 | Parmigiani | 399/43 |
| 4,136,945 | 1/1979 | Stephens | 399/43 |
| 4,970,557 | * 11/1990 | Masuda et al. | 399/43 |
| 5,272,503 | 12/1993 | LeSueur et al. | 399/25 |
| 5,285,242 | * 2/1994 | Kotani | 399/43 |
| 5,491,540 | 2/1996 | Hirst | 399/12 |
| 5,737,663 | * 4/1998 | Handa et al. | 399/50 |
| 5,749,019 | * 5/1998 | Mestha | 399/46 |
| 6,014,161 | * 1/2000 | Hirsst et al. | 347/132 X |

* cited by examiner

Primary Examiner—Joan Pendegrass
(74) Attorney, Agent, or Firm—John A. Brady

(57) ABSTRACT

An improved EP printer will automatically compensate for printer output darkness shift over the usage life of one or more components of the print engine. In many EP print engines, the printer output darkness without correction will gradually change as the components are used, and typically, the darkness will increase to an extent that is perceptible. The printer output darkness can be controlled using a EP operating point that changes certain operating parameters, such as the laser diode current, the duty cycle of the video data signals driving the laser diode, and other voltage parameters including the charge roller voltage, or the developer bias voltage. It is desirable to make adjustments over the usage life of these components, so as to maintain the initial printer output darkness throughout the life of the major system components. The adjustments can occur at periodic intervals based upon a metric that includes one or more of the following parameters: number of pels produced, number of pages printed, number of cycles of one or more components of the print engine, and/or the consumption of toner in grams. The adjustment information can be provided as look-up tables, or in the form of transfer functions. If look-up tables are used, the adjustment control algorithm could be one that interpolates between periodically-adjusted usage values stored in the look-up tables. Since many EP process cartridges tend to print darker rather than lighter over the life usage of that process cartridge, the present invention will accomplish two important goals by utilizing the methodology described above; not only will the printer output darkness be maintained at a substantially constant value, but the actual number of pels printed and pages printed will be increased by use of the same quantity of toner stored within the replaceable process cartridge.

42 Claims, 10 Drawing Sheets

METHOD AND APPARATUS FOR COMPENSATING FOR A DARKNESS SHIFT DURING THE LIFE OF AN ELECTROPHOTOGRAPHIC PRINTER CARTRIDGE

TECHNICAL FIELD

The present invention relates generally to image forming equipment and is particularly directed to electrophotographic printers of the type which utilize a replaceable cartridge that contains toner. The invention is specifically disclosed as a method for compensating for a darkness shift of the laser printer's output over the life of a replaceable EP process cartridge due to certain parameters that vary with the usage of the cartridge.

BACKGROUND OF THE INVENTION

Many electrophotographic (EP) printers and copiers utilize laser printheads that operate by discharging small areas of a photoreceptor, after which toner is applied to the photoreceptor in a manner such that some toner is attracted to the areas of the photoreceptor that have been discharged by the laser light. Once that has occurred, a sheet of print media is applied to the photoreceptor in a manner that the toner adheres to the sheet of print media in the same pattern to which the toner was attracted to the photoreceptor.

EP printers and copiers usually provide toner through a developer section that uses a doctor blade to uniformly spread the toner particles along the entire width of the developer section so that toner is available across the imaging width of the photoreceptor. In many laser printers, the photoreceptor is cylindrical in shape and is commonly referred to as a photoconductive (PC) drum, which is charged to a relatively high voltage by a charge roller. The areas of the PC drum that maintain this large voltage magnitude tend to repel toner particles, while the discharged areas of the PC drum tend to attract toner particles.

The electrical characteristics of the main components of a laser print engine will typically degrade somewhat during usage of the components. For example, the charge voltage on a PC drum will tend to decrease over its usage life because the voltage supplied by the charge roller will encounter a higher resistance as the surfaces of the major components become somewhat contaminated. The PC drum itself can have its capacitive characteristics change over time as a cleaner blade scrubs away toner particles that did not adhere to print media during a printing operation.

As the components of a laser print engine tend to degrade somewhat during the life span of the print engine, the printer output darkness will gradually become either lighter or darker. In many EP printers, the printer output darkness gradually turns darker over the life of a removable EP process cartridge, and without any type of correction, this gradual darkness increase can become noticeable to the human user. By the end of the life span of some EP process cartridges, the printer output darkness may have shifted by as much as 15 L* units (of CIELAB L*a*b* color space). Consequently, when a new process cartridge is installed, the printer output darkness will be noticeably lighter to many human users.

There have been some attempts in the past to adjust certain operating parameters to account for certain changes in properties of EP printers and copiers. For example, U.S. Pat. No. 4,136,945 (by Stephens) discloses an illumination control system for EP copiers that can compensate for changes in the electro-photosensitive properties of the reusable photoconductive insulator member during its useful life. The Stevens system senses and stores usage information about the photoconductive member, and over the life of the photoconductor can increase the exposure in accordance with a non-linear schedule that corresponds to photochemical, sensitometric changes that occur with increasing cumulative usage.

U.S. Pat. No. 3,575,505 (by Parmigiani) discloses an EP printer or copier that compensates for the gradual deterioration of performance of the electrophotosensitive member by gradually raising the bias voltage on the development electrode. The Parmigiani system counts the number of cycles of operation of the EP printer or copier and changes the bias voltage applied to the magnetic brush in response to a predetermined number of cycles in the machine. In this manner, the bias voltage is automatically raised, based upon the number of copies produced by the machine.

U.S. Pat. No. 5,272,503 (by LeSueur) discloses an EP printer or copier that stores a value that varies as a function of usage of a replaceable sub-assembly, and a controller automatically adjusts a selected operating parameter in accordance with a stored value to maintain the printing quality of the printer/copier. The operating parameters that may be adjusted include the photoreceptor charge level, exposure level, developer bias level, and the response level of the automatic density control system. The memory of a replaceable cartridge or cassette that holds toner can store the print count, number of revolutions of the photoconductive belt, number of charge cycles, and the difference between an intended and the actual charge on the photoreceptor. One of the problems that LeSueur notes is when the age of the cassette increases, the characteristics of the developer device may change, thereby leading to deterioration of the line development performance of the printer, even though the solid area development capability may remain constant. This may be corrected by adjusting the automatic density control setpoint to restore the line development performance. Another effect noted by LeSueur that may occur as the cassette ages is that concentration of toner in the sump of the developer device may drop even though the print quality parameters are satisfied. Use of the cassette at such reduced toner concentration levels may cause a shortening of the life of the developer material, and thus of the cassette. The LeSueur system adjusts the parameters to maintain the toner concentration at its desired level over the age of the cassette, by increasing the toner concentration to prevent a shortening of the life of developer material, thus prolonging the useable life of the cassette.

The patents discussed above may increase the life of a replaceable cassette or cartridge, or they may keep certain operating parameters to a more nominal value over the life of the EP printer, but they do not specifically compensate for a gradual increase or decrease in printer output darkness of an EP printer or copier.

SUMMARY OF THE INVENTION

Accordingly, it is a primary advantage of the present invention to provide an EP print engine that can automatically compensate for printed output darkness shift of an image forming apparatus by periodically adjusting a control level corresponding to an operating parameter of the print engine after a predetermined quantity of usage. It is another advantage of the present invention to automatically compensate for printed output darkness shift of an EP image forming apparatus by periodically adjusting an EP printer operating point (an "EP operating point") that controls the energy density of a light beam striking a photoreceptor to either increase or reduce the darkness of the printed output produced by the EP image forming apparatus. It is a further advantage of the present invention to automatically compensate for printed output darkness shift of an EP image forming apparatus by periodically adjusting an EP operating point that adjusts one or more operating parameters of one or more print engine components at predetermined usage intervals, by use of look-up tables that store adjustment information, or by use of transfer functions that continually adjust certain operating parameters over the life usage of the process cartridge or of a component of the print engine main body. It is yet a further advantage of the present invention to compensate for printed output darkness shift of an image forming apparatus by making periodic or continual adjustments to certain operating parameters involved with the effective printer output darkness, and in which a Toner Darkness setting can be controlled by a user, and in which the adjustments are automatically made to compensate for the printer output darkness shift at all possible user settings.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved EP printer or EP copier is provided that will automatically compensate for printer output darkness shift over the usage life of one or more components of the print engine. In an EP print engine that utilizes a laser printhead, the printer output darkness will vary when certain printer operating parameters (also referred to herein as an "EP operating point" or "EPOP") are changed, such as the laser diode current, the duty cycle of the video data signals driving the laser diode (particularly when the video information can be adjusted as to the number of slices per pel), and other voltage parameters that are changed, including the charge roller voltage that makes contact with the photoreceptor, or the developer bias voltage.

Since many EP printers will either increase or decrease in printer output darkness over the life usage of the replaceable process cartridge, or of a component in the print engine, it is desirable to make adjustments over the usage life of these components. The adjustments can occur at periodic intervals based upon a metric that includes one or more of the following parameters: number of pels produced, number of pages printed, number of cycles of one or more components of the print engine, and/or the consumption of toner in grams. The adjustment information can be stored in several places within a printer, including the memory elements of the printer's main body, memory elements in the print engine, and/or memory elements of a replaceable process cartridge. The adjustment information can be provided as look-up tables, or in the form of transfer functions. If look-up tables are used, the adjustment control algorithm could be one that interpolates between periodically-adjusted usage values stored in the look-up tables.

The primary methodology used in the present invention is to create a printer output darkness that always substantially appears as the initial printer output darkness when the printer and its replaceable process cartridge were new. Accordingly, upon every initialization the printer will read the current setting of printer output darkness, which is particularly appropriate in certain Lexmark laser printers that allow a user to make manual adjustments to an attribute called "Toner Darkness." Even if the default value for Toner Darkness is always used in a particular printer, the printer output darkness value will be adjusted over the life usage of the printer and its process cartridge according to the present invention.

Once the current printer output darkness setting has been determined, the type of EP process cartridge currently installed in the printer's main body is determined, and this determination can be based upon information stored in a memory element mounted on the replaceable process cartridge itself. After that has been determined, the quantity of toner that has been consumed from this process cartridge is determined (or, if a different metric is used, then that quantity is determined). This provides an indication of the cumulative life usage of the replaceable process cartridge up to this time. At this time, the appropriate printer output darkness setting is determined based upon the above data, and the printer decides whether or not an adjustment is needed to the printer output darkness setting. If so, an appropriate adjustment is made to the printer components so that they will operate at the proper printer output darkness, essentially by adjusting a control level that affects the energy density of laser light on the PC drum (thereby adjusting the EP operating point or "EPOP"). This will accomplish the main goal of the present invention, which is to maintain the printer output darkness to substantially its initial value throughout the entire life of the replaceable process cartridge.

The same type of methodology can be utilized to adjust other printer operating parameters that do not correspond to any components within the process cartridge. This would be appropriate for components that are maintained within the main body of the printer, in which these components will also degrade somewhat over the usage of the printer main body, such that this degradation will have an effect on the printer output darkness. In that situation, the printer main body will maintain life usage history information, and appropriate adjustments could be made based upon that as a metric.

Since many EP process cartridges tend to print darker rather than lighter over the life usage of that process cartridge, the present invention will accomplish two important goals by utilizing the methodology described above. In the situation where the printer output darkness is continually lightened by use of the present invention, not only will the printer output darkness be maintained at a substantially constant value, but the actual number of pels printed and pages printed will be increased by use of the same quantity of toner stored within the replaceable process cartridge. Thus the process cartridge will have an increased life span at the same cost of manufacture.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
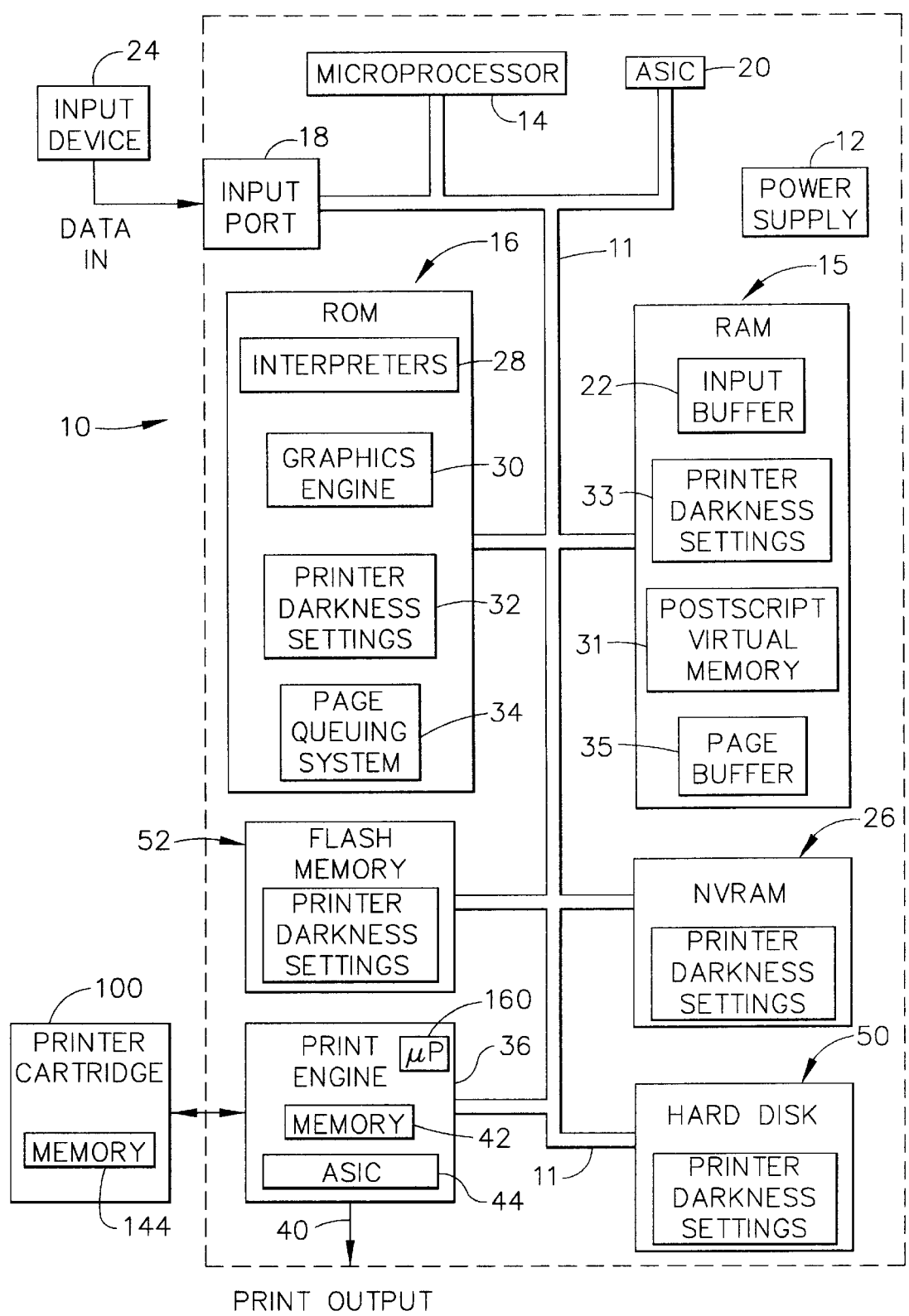
FIG. 1 is a block diagram of the major components of a printer, as constructed according to the principles of the present invention.

Referring now to the drawings, FIG. 1 shows a hardware block diagram of a laser printer generally designated by the reference numeral 10, although virtually the same components will be found on many ink jet printers. Laser printer 10 will preferably contain certain relatively standard components, such as a DC power supply 12 which may have multiple outputs of different voltage levels, a microprocessor 14 having address data lines, and control and/or interrupt lines, Read Only Memory (ROM) 16, and Random Access Memory (RAM) 15, which is divided by software operations into several portions for performing several different functions.

Laser printer 10 also contains at least one input port, or in many cases several types of input ports, as designated by the reference numeral 18. Each of these ports would be connected to a corresponding input buffer, generally designated by the reference numeral 22 on FIG. 1. Each port 18 would typically be connected to an output port of either a personal computer (PC) or a workstation (WS) (designated on FIG. 1 as an "input device" 24) that would contain a software program such as a word processor or a graphics package or computer aided drawing package, or to a network that could be accessed by such a PC or WS. Laser printer 10 preferably will also contain an Application Specific Integrated Circuit (ASIC) 20, which typically contains a large number of programmable logic circuits.

Once text or graphical data has been received by input buffer 22, it is commonly communicated to one or more interpreters designated by the reference numeral 28. A common interpreter is PostScript™, which is an industry standard used by many laser printers. To speed up the process of rasterization, a font pool and typically also a font cache are stored in memory within most laser printers. Such font pools and caches supply bitmap patterns for common characters so that a graphics engine 30 can easily translate each such character into a bitmap using a minimal elapsed time.

Other types of information are also stored in various memory components within printer 10. This includes a "Toner Darkness" attribute that can be set by a human user, or it can be left alone at its default value. Some of the memory components in which printer output darkness information can be stored include memories that are designated by the reference numerals 32, 33, 26, 50 and 52 on FIG. 1. In addition, the data that controls the physical components that affect actual printer output darkness, and thereby implement the printer output darkness settings, is also stored in one or more of these memory components. This includes data that can adjust the effective printer output darkness setting based upon previous usage of an EP process cartridge, for example. The description of this type of data will be discussed in greater detail, hereinbelow.

The memory devices designated by the reference numerals 32 and 33 will typically be found in most laser printers, as part the normal RAM 15 and ROM 16 found in virtually every microprocessor-driven device, and further, an NVRAM memory at 26 is typically provided in such systems. The memory devices designated by the reference numerals 26, 50, and 52 may be options on many if not most laser printers, in which a hard disk drive 50 and/or a Flash memory device 52 can be added to the base printer upon the request of the user/customer. Such alternative storage memory devices also will likely appear in top-line ink jet printers in the future.

Once the data has been rasterized, it is directed by a page queuing system 34 into a page buffer, which is a portion of RAM designated by the reference numeral 35. In a typical laser printer, an entire page of rasterized data is temporarily stored by the page queuing system 34 in the page buffer 35, although some of the more modern laser printers do not buffer an entire page's worth of data at one time, thereby managing to operate with a much smaller amount of RAM in a "partial page buffer." The data within the page buffer 35 is communicated in real time to a print engine designated by the reference numeral 36. Print engine 36 includes a laser light source 86 (see FIG. 4) within its printhead, and its output 40 is the physical printing onto a piece of paper, which is the final print output from laser printer 10. Print engine 36 also may contain a programmable non-volatile memory device 42, in addition to registers contained within its ASIC 44 that may act as either RAM or ROM, as desired. Programmable memory device 42 could consist of a Flash type-device, or an NVRAM-type device, for example, or any other type of non-volatile memory device. Of course, certain printer-specific information, or EP process cartridge-specific information, could be stored within the programmable memory device 42, and preferably this information can be updated from a host computer (e.g., input device 24) if desired. This concept will be discussed in greater detail hereinbelow, as applicable to the present invention.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers. For ease of illustrating the present invention, the various buses used within printer 10 are grouped on FIG. 1 into a single bus pathway, designated by the reference numeral 11.

A portion of the RAM 15 is typically allocated for virtual memory for at least one interpreter, and on FIG. 1 a POSTSCRIPT virtual memory is depicted at the reference numeral 31. This virtual memory 31 can, for example, be used for storing PostScript font descriptors within the printer. In addition, particularly important information that is to be retained in printer 10 while unpowered can be stored in a quickly accessible non-volatile memory location called "NVRAM," which is designated by the reference numeral 26. This non-volatile RAM is most likely (using today's technology) an EEPROM integrated circuit chip.

A replaceable cartridge, generally designated by the reference numeral 100, is used in typical printing devices available at the present time. For laser printers (or other types of electrophotographic printing devices), reference numeral 100 represents a replaceable EP process cartridge that contains toner material, as well as a new photoconductive drum unit 132 (see FIG. 2) supplied in most such EP process cartridges. The EP process cartridge typically contains black toner material for monochrome laser printers, and at least three different toner materials for color laser printers (for the standard "process" colors of cyan, magenta, and yellow—and possibly black), although multi-color EP printers and copiers are also available that use multiple individual toner cartridges that each contain only a single color of toner material. Whether or not a black toner cartridge—or a black toner "bay" of a multi-color EP process cartridge—is included for the particular printer or copier is a matter of design choice.

Some conventional EP process cartridges contain a non-volatile memory device, such as an EEPROM chip or an EPROM chip. For purposes of the present invention, the cartridge 100 contains a non-volatile memory device 144 that is programmable. Programmable memory device 144 could consist of a Flash type-device, or an NVRAM-type device, for example, or any other type of non-volatile memory device.

It may be useful to be able to update some of the stored information contained in this memory device 144. On the other hand, a write once-read often memory device could be used in conjunction with the present invention in a situation where the information stored therewithin is specific to certain characteristics of this particular cartridge 100. For example, in a laser printer one EP process cartridge 100 could provide a certain type of PC drum that produces a particular response curve vs. intensity level of the image data, whereas a second, later design EP process cartridge 100 could provide a somewhat different type of PC drum that produces a different particular response curve vs. intensity level of the image data. Such characteristics could be stored on memory device 144 and reported to the print engine 36 when the EP process cartridge 100 is installed into the main printer body of printer 10.

Other types of data could also be stored on the memory device 144, such as "use" data, as will be described in greater detail, hereinbelow. In many situations, such "use" data will preferably be stored in a manner that cannot later be modified. This is another circumstance where the use of a write once-read often memory device could be used to advantage to track certain parameters relating to the usage history of this particular EP process cartridge 100. Moreover, programmable memory device 144 could be provided as a hybrid chip, such that a first portion is programmable multiple times by the printer, and that a second portion is only programmable once (thereby functioning as the write once-read often memory device described above).

Removable "process cartridge" 100 is provided in printer 10 so that some of the main consumable or wearing components of the printer can be easily replaced in a unitary structure. Process cartridge 100 includes two major sub-assemblies, designated by the reference numerals 110 and 130. Sub-assembly 110 contains the toner reservoir and developer unit, whereas sub-assembly 130 contains the photoconductive (PC) drum and the cleaner reservoir.

Figure 2:
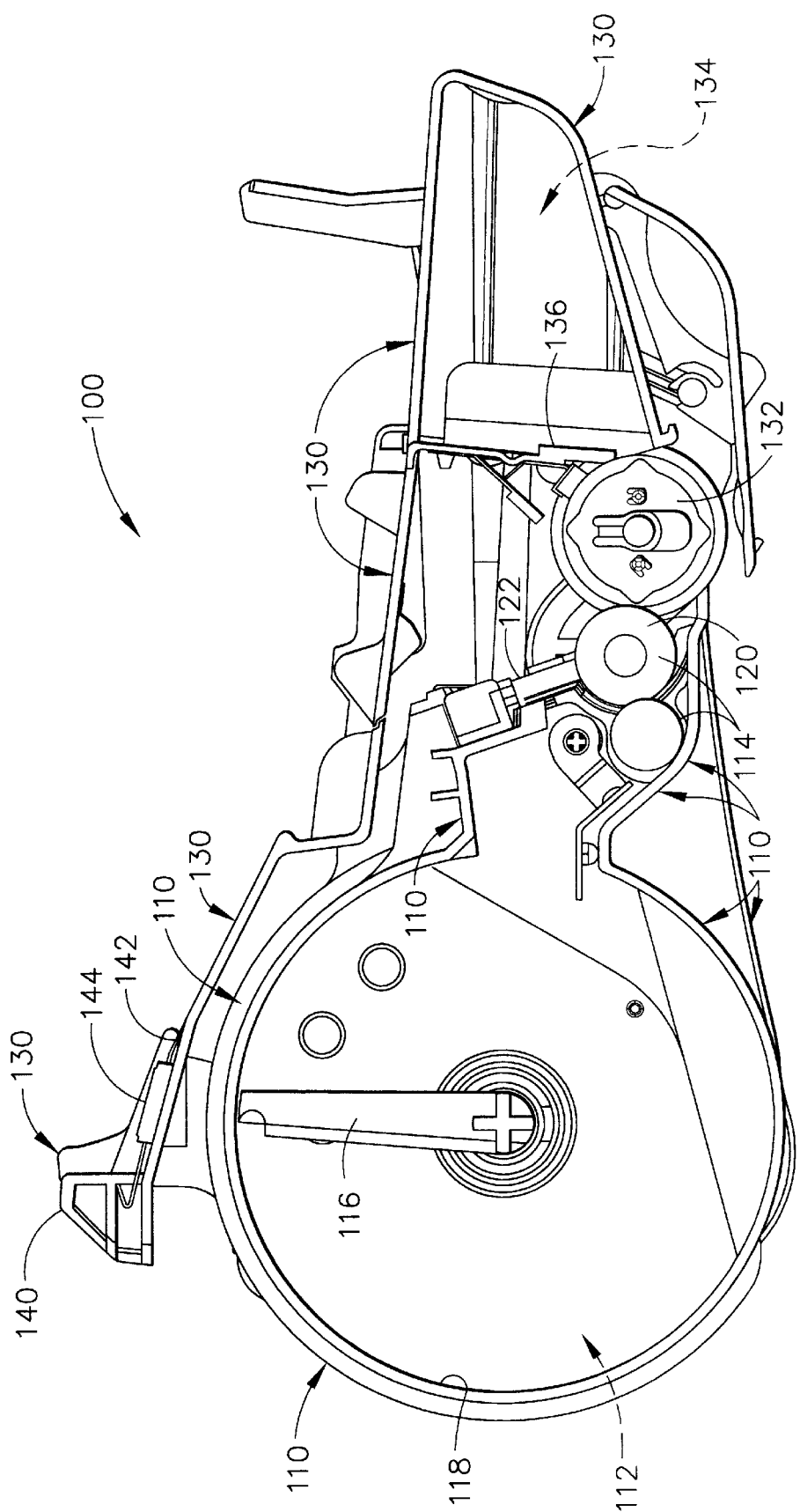
FIG. 2 is a side view in partial cut-away of a printer's process cartridge, as constructed according to the principles of the present invention.

The toner/developer sub-assembly 110 depicted on FIG. 2 includes a toner housing 118, toner reservoir 112, and a toner paddle wheel 116. The developer unit 114 includes rollers, including the final developer roller 120, which also is in contact with a doctor blade 122. As is well known to those of ordinary skill in the art, the toner material leaves the reservoir 112 and enters the developer unit 114, where the toner material is evenly spread by the doctor blade 122 across the width of the developer roller 120. At that point, the toner material is in proper condition to come into contact with the photoconductive drum 132.

The cleaner housing sub-assembly 130 includes a cleaner reservoir 134, a PC drum 132, and a cleaner wiper 136, as major internal components. The cleaner housing sub-assembly 130 extends to the left and above (on FIG. 2) the toner/developer sub-assembly 110 such that a portion of the cleaner housing sub-assembly (at the reference numeral 140) will approach an internal portion of the main body of printer 10. This portion 140 that extends to the main body of the printer includes two electrical components that make electrical contact with the circuits of the main printer body. These two components include a memory device 144 that is contained within a stainless steel casing, and a stainless steel flat plate 142.

Memory device 144 comprises a non-volatile memory device that stores important information relating to printer 10 and process cartridge 100. The top of the stainless steel casing makes electrical contact with a conductor in the printer main body, and the flat plate 142 acts as a return path conductor that mates with another conductor within the printer main body.

Figure 3:
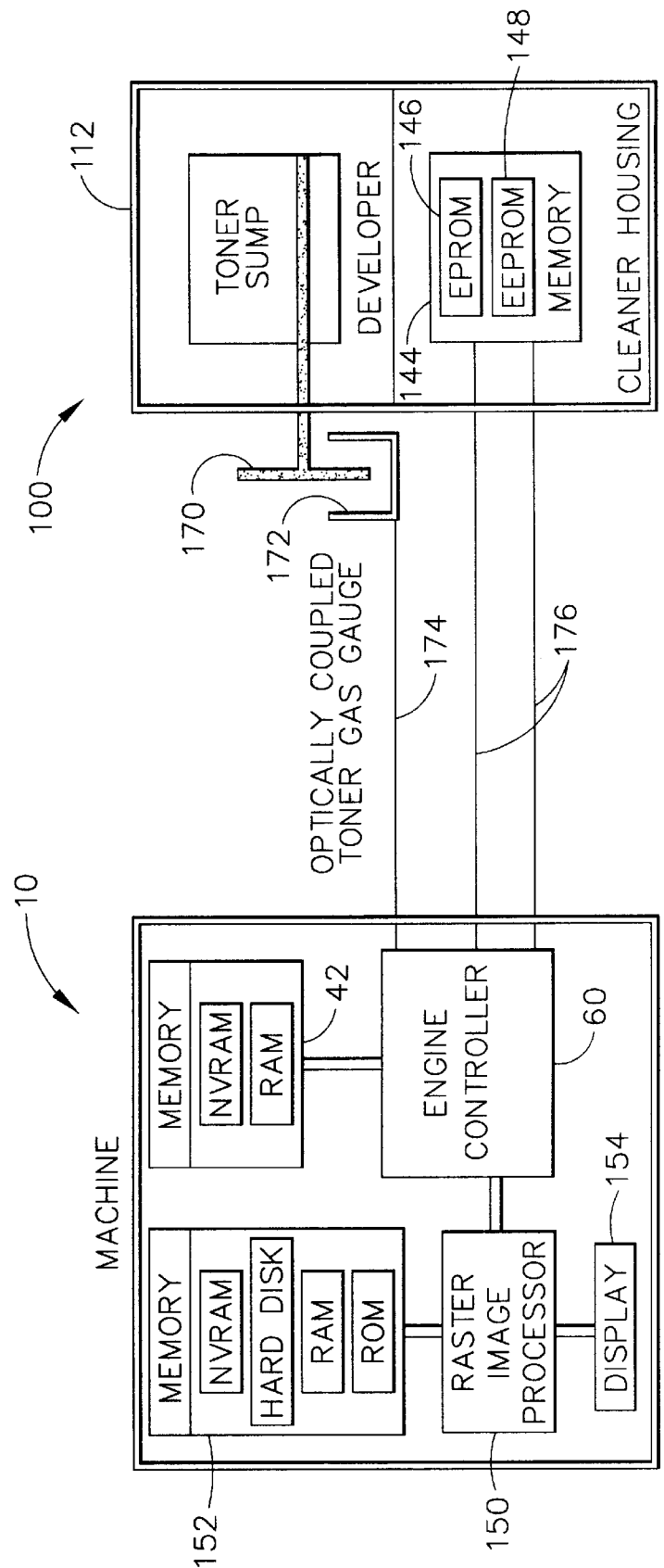
FIG. 3 is a diagrammatic view of a combination of the printer main body of FIG. 1 and the process cartridge of FIG. 2.

FIG. 3 illustrates in block diagram form some of the major components of the printer 10 and how it interfaces with the process cartridge 100. In the printer 10, a raster image processor (RIP) 150 is depicted as being in communication with an "engine controller" 160. The raster image processor 150 includes the microprocessor 14 (see FIG. 1), and also performs certain functions such as the rasterizing function performed (in FIG. 1) by the graphics engine 30. Raster image processor 150 will also be referred to herein as the "RIP" 150, and it interfaces via electrical buses to memory devices, such as depicted on FIG. 3 by the reference numeral 152. As can be seen on FIG. 3, the memory device 152 includes RAM, ROM, and NVRAM, which roughly correspond to the ROM 16 on FIG. 1, as well as the NVRAM 26 and other random access memory devices depicted on FIG. 1.

The RIP 150 also is in communication with a display 154, which preferably comprises a liquid crystal display that can show alphanumeric characters, as are commonly seen on laser printers. The RIP 150, using its programming located in the ROM and data located in its RAM and NVRAM, will control the information depicted on the display 154, and will also control the data flow to and from the engine controller 160.

The engine controller 160 is part of the print engine 36 (see FIG. 1), and is in communication with its own set of RAM and NVRAM, designated by reference numeral 42. It is possible for the NVRAM and RAM memory devices 42 to comprise physical integrated circuits that are also used in part as the NVRAM and RAM 152 used by the RIP 150. However, it is preferred that the portion of RAM in memory device 42 comprise memory registers of an application specific integrated circuit (e.g., ASIC 44) that are used exclusively for the engine controller 160. Engine controller 160 preferably is a microprocessor or microcontroller, and may well be resident within ASIC 44.

Engine controller 160 is also in communication with an optically coupled toner "gas gauge sensor" 172, via an electrical conductor 174. Engine controller 160 is also in communication with the memory device 144 that is mounted to the cleaner housing sub-assembly 130 of the process cartridge 100. This interface between engine controller 160 and the memory device 144 is preferably via a two-wire electrically conductive path 176.

On FIG. 3, the toner reservoir 112 is depicted diagrammatically by the terminology "toner sump" and FIG. 3 also diagrammatically shows a "toner wheel" 170 having a shaft that protrudes through the toner sump 112. The operations of toner wheel 170 and its associated optical coupler 172 are described in detail in U.S. Pat. No. 5,634,169 (assigned to Lexmark International, Inc.), which is incorporated herein by reference in its entirety. In general, the optical coupler 172 outputs electrical pulses indicative of wheel position along electrical conductor 174 upon every single rotation of the toner wheel 170. The toner wheel 170 turns in conjunction with the paddle wheel 116 (see FIG. 2), which stirs the toner material and tends to drive that toner material into the developer unit 114. When the print engine 36 turns on its transport motor (not shown) to move a sheet of print media through the print engine 36 and past the laser printhead (i.e., laser diode 86 on FIG. 4), the toner wheel 170 rotates.

In addition to counting the pulses that travel along electrical conductor 174, the engine controller 160 and the toner wheel 170 are also designed to determine how much toner material remains within the toner sump (or reservoir) 112. This feature is described in detail in U.S. Pat. No. 5,634,169. By analyzing the information provided by the toner wheel 170, it is possible to create a "gauge" of discrete steps that give a reliable indication as to the actual amount of toner material remaining within the toner reservoir 112 as the toner begins to empty from that reservoir. The gauge of discrete steps of remaining toner material is also referred to herein as a "toner gas gauge," which uses a "gas gauge toner sensor" ("GGTS") that indicates, after a certain amount of the toner material has been dispensed from the toner reservoir 112, the actual amount of remaining toner in the reservoir in discrete steps that are indicative as to the amount of grams of remaining toner material.

This toner "gas gauge" function and its associated apparatus are described in greater detail in two commonly-owned U.S. patents assigned to Lexmark International, Inc., both of which were filed on May 12, 1997, and are now issued as U.S. Pat. Nos. 5,802,420 and 5,797,061, both of which are incorporated herein by reference in their entirety. As will be discussed in more detail hereinbelow, the toner wheel indication in discrete steps is also referred to herein as a toner wheel "bucket," which is a rough indication as to the amount of grams of toner material remaining in the reservoir 112. Each toner wheel bucket level changes at a pre-determined amount of remaining toner material (see Table #1, below, for a typical large capacity toner cartridge used with a Lexmark model OPTRA S laser printer), and this quantity of remaining toner material is repeatable with a sufficient accuracy across different process cartridges used in Lexmark laser printers. This repeatability is also maintained for different sizes of such process cartridges.

For example, the "top" bucket level is bucket number 9, and the toner wheel continues to indicate bucket 9 for well over half of the cartridge's initial usage (at least for one of the larger cartridge sizes available from Lexmark International, Inc.). Only when the remaining quantity of toner material falls to approximately 221 grams does the bucket level change from "TWB9" to "TWB8" (i.e., toner wheel bucket level "8"). After that first transition, the bucket level remains at TWB8 while the toner remaining quantity falls to approximately 204 grams, at which time the bucket level makes another transition to "TWB7." These bucket level transitions occur throughout the remaining life of the process cartridge, until reaching the final transition from bucket level "TWB1" to bucket level "TWB0," which occurs at approximately 85 grams of remaining toner material.

TABLE 1

| BUCKET LEVEL USED | GRAMS OF TONER REMAINING | GRAMS OF TONER |
|---|---|---|
| 9 | Capacity (about 600 g) through 222 g | 0 g |
| 8 | 221–205 g | 379 g |
| 7 | 204–188 g | 396 g |
| 6 | 187–171 g | 413 g |
| 5 | 170–154 g | 430 g |
| 4 | 153–137 g | 447 g |
| 3 | 136–120 g | 464 g |
| 2 | 119–103 g | 481 g |
| 1 | 102–86 g | 498 g |
| 0 | 85–0 g | 515 g |

The memory device 144 typically comprises a Dallas Semiconductor, Inc. integrated circuit, part number DS1982, which is a "one-wire" EPROM-type read only memory device. While most EPROM's are capable of being erased (hence the letter "E" in "EPROM"), the DS1982 integrated circuit is first erased with ultraviolet light at the time of manufacturing, and then its ultraviolet window is permanently sealed so that the chip cannot later be erased after a bit is "burned" or "blown" by a method well known in the art within the EPROM device. Using this construction, the preferred EPROM chip becomes a "one-way" device that can be written to only once, but read many times. Such a chip is also referred to in the industry as an "add-only memory."

Since the above-described memory device 144 is not only a non-volatile memory device, but also a "one-way" add-only memory device, it can be used to permanently record certain information about the usage of the printer and the process cartridge that cannot be later altered by a user, or anyone else for that matter. This feature is very useful in non-reusable cartridges since the incremental amount of toner that has been consumed by the printer using a particular process cartridge can be determined and stored in the EPROM. In this manner, any printing adjustments based upon toner usage can be made with confidence that a grossly incorrect reading of remaining toner can only mean that additional toner material has been added or subtracted without authorization, or that the toner wheel has been tampered with.

On the other hand, if it is desirable to be able to write data multiple times into the memory device 144, then an EEPROM-type device may be more suitable. As an alternative, memory device 144 could encompass both an EPROM chip (e.g., at reference numeral 146) and an EEPROM chip (e.g., at reference numeral 148), or a hybrid chip that includes certain memory elements of each type on a single substrate.

Figure 4:
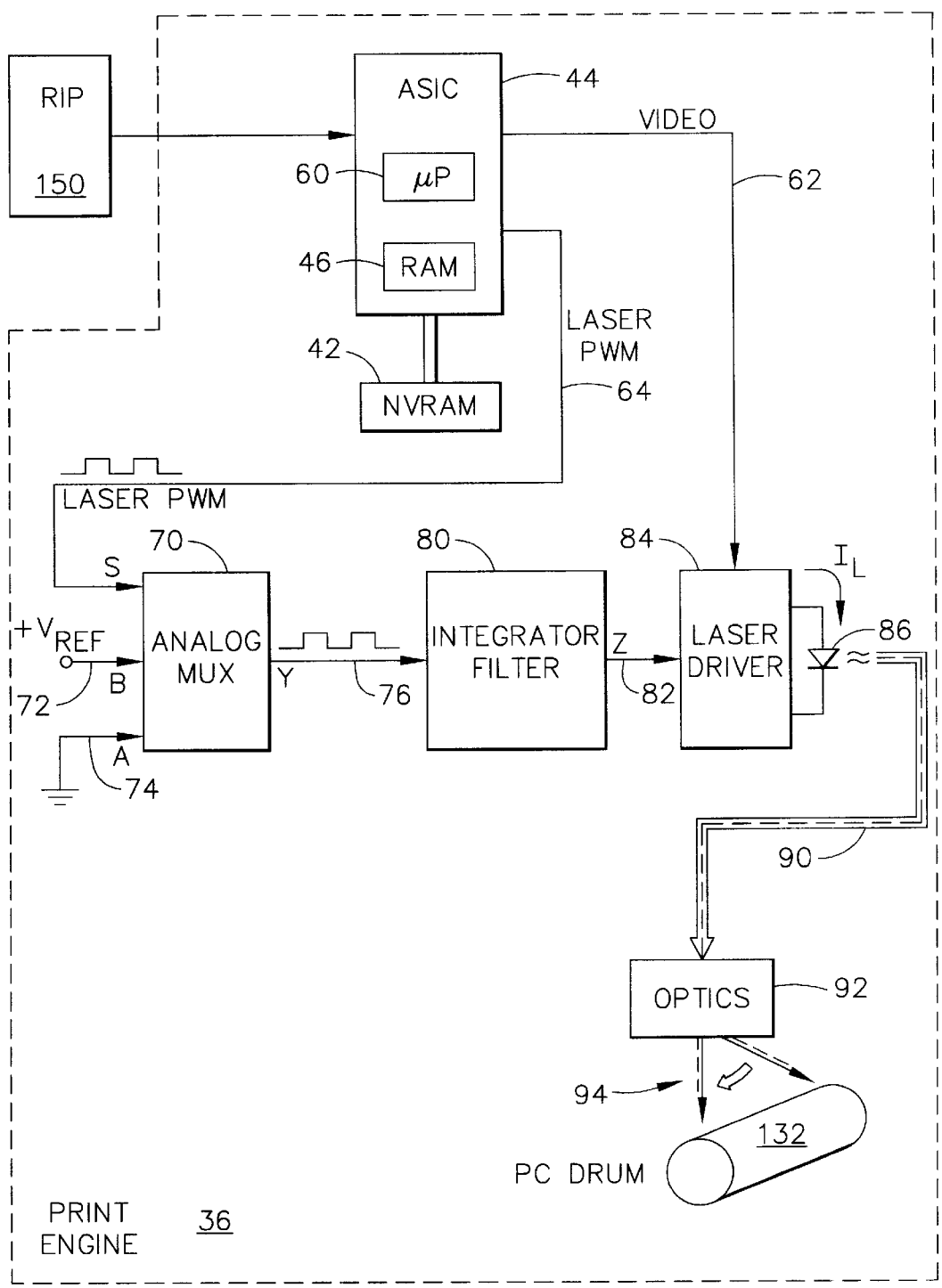
FIG. 4 is a block diagram of some of the major components of a laser print engine, as constructed according to the principles of the present invention.
Figure 5:
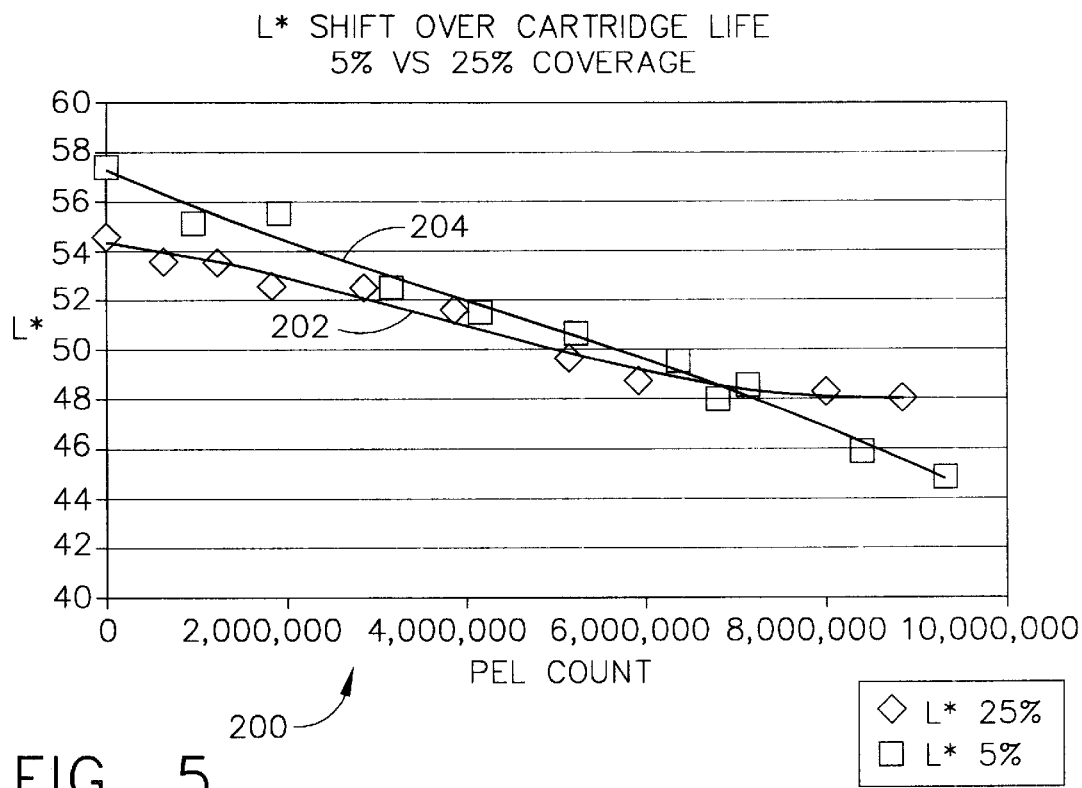
FIG. 5 is a graph showing printer output darkness shift over cartridge life versus pel count.

FIG. 4 illustrates some of the major components of a laser print engine 36 which particularly pertain to the present invention. The raster image processor 150 is illustrated as a single block that feeds data to the ASIC 44 of print engine 36. In this illustrated embodiment, ASIC 44 contains a microprocessor at the reference numeral 60, and further contains a certain amount of random access memory at reference numeral 46. Print engine 36 also contains some non-volatile random access memory at reference numeral 42, which is useful for storing operating data that may be changeable by the printer, or by the user (via the printer), and yet is important enough information that it should be preserved through a reset or power off condition of the printer 10.

It will be understood that ASIC 44 does not require an internal microprocessor or, for that matter, RAM. Instead, a separate microprocessor or microcontroller integrated circuit could be provided that would interface to a different style ASIC, and further, separate RAM integrated circuits could be provided to interface to the microprocessor or microcontroller, and potentially also could independently interface to the ASIC. Moreover, it will be understood that the non-volatile RAM type of memory may not be required at all for certain applications of laser printers, and this type of memory device could thereby be eliminated altogether. More likely, a non-volatile memory device could be supplemented or expanded in situations where having a non-volatile memory is critically important for a particular control application of the laser print engine 36.

ASIC 44 provides two digital outputs named "VIDEO" at 62 and "LASER PWM" at 64. The VIDEO output 62 is provided to a laser driver circuit 84 that, in turn, drives current through a laser diode 86 that creates the individual spots on the photoconductive drum 132. This VIDEO signal 62 is provided to the laser driver 84 in real time to match up to the requirements of placing the spots of laser light onto the PC drum 132 at the proper X- and Y-coordinates on the PC drum 132.

The output signal LASER PWM 64 is used to drive the "Select" input of an analog multiplexer 70. This LASER PWM signal 64 is a pulse width modulated signal that preferably has an 8-bit precision. Using this precision, there are 256 different possible duty cycles provided by this pulse width modulated signal.

The main analog inputs for analog multiplexer 70 are designated as "A" at 74 and "B" at 72. As can be seen from FIG. 4, the A input is connected directly to ground potential, and the B input is directly connected to a reference voltage. The analog output "Y" at 76 of analog multiplexer 70 will be driven to the voltage level of one of the inputs A or B, depending upon the logic state of the Select input "S" at which the LASER PWM signal is connected. In the illustrated example of FIG. 4, when the Select input at S is driven to Logic 1, then the B input at 72 is switched to the output Y at 76. On the other hand, if the Select input at S is driven to Logic 0, then the ground potential at input A is switched to the output Y at 76. Consequently, the greater the duty cycle of the LASER PWM signal 64, the greater the duty cycle of the output signal Y at 76.

The output signal Y of analog multiplexer 70 is driven into an integrator and filter circuit at reference numeral 80. This integrator/filter circuit 80 is designed to provide a stable DC output voltage at "Z" at 82, and this DC voltage is provided to laser driver 84. This DC voltage at 82 is directly proportional to the current $I_L$ that flows through the laser diode 86 at times when the VIDEO signal 62 commands laser driver circuit 84 to drive current through this laser diode 86. Integrator/filter circuit 80 provides a very stable and precise DC voltage at its output Z, and this DC voltage will rise if either the duty cycle of the output signal Y increases or if the reference voltage at B increases, and alternatively, the DC voltage at Z will fall if the duty cycle at the output signal Y decreases, or if the reference voltage at the B input also decreases.

Laser diode 86 outputs a beam of laser light at times that the VIDEO signal 62 commands laser driver 84 to provide current to laser diode 86. This beam of light is illustrated at the reference numeral 90 on FIG. 4. Light beam 90 is driven through a set of optics at 92 which represent the collimation lens, polygonal mirror, function of theta $\{f(\theta)\}$ lens, and a fold-down mirror, which are components typically found in laser print engines. Finally, the optics 92 produce a sweeping beam of light at 94 that strikes the photoconductive drum 132 at positions that are to attract toner that will ultimately be deposited on a sheet of print media by the print engine 36.

Laser printers manufactured by Lexmark International, Inc. have for many years provided a "darkness level" attribute for adjustment by the user, if desired. In other words, the human user of the printer can change an adjustable setting (i.e., the "Toner Darkness" setting) on a page by page basis, if that human user decides that the printer output darkness should be made lighter or darker. These Printer Darkness settings have been made available in the range of one (1) through ten (10), in which ten (10) is the darkest setting. Depending upon the model of printer, the default setting has been either seven (7) or eight (8).

When a user changes the Toner Darkness setting of the laser printer, the ASIC 44 will adjust the duty cycle of the LASER PWM signal 64, and further may also adjust the number of "slices" per printed pel, which will affect the VIDEO signal information that controls the output current timing of laser driver 84. As related above, the LASER PWM signal 64 preferably has an 8-bit resolution, and the duty cycle can thereby be tightly controlled to a precision of less than one-half percent tolerance. If the print resolution is 600 dpi (dots per inch), then the current generation of Lexmark laser printers at certain printing speeds can divide each $\frac{1}{600}^{th}$ inch pel into eight (8) slices, so that a "full" pel will only be printed if all eight slices are turned on for the entire pel. This is not normally done, because sufficient printer output darkness usually occurs with less than the full eight slices for any given pel, depending upon the type of image being printed. This is true even for character data, in which each pel that makes up part of an alphanumeric character will ostensibly be a full black pel, however, this "full" black can normally be achieved by having only four through seven, inclusive, of the slices turned on for each of those pels that make up the character bitmap pattern.

By use of these available control level mechanisms, if the human user decides to make the printer output darkness somewhat "lighter," then he or she will decrease the Toner Darkness setting, which will in turn reduce either or both of the duty cycle of the LASER PWM signal at 64 and the slices per pel of the VIDEO signal at 62. There are other characteristics of a laser print engine that can also affect the darkness of the image that is ultimately printed. Two of these attributes are the charge roller voltage and the developer bias voltage. These voltages can also be increased or decreased in order to either darken or lighten the image being printed. The control over these voltage parameters is typically provided with a pulse width modulated signal, and while the duty cycle of these pulse width modulated signals can be fairly precisely controlled, their effect on printer output darkness is not necessarily linear with respect to the duty cycles of these two voltage signals.

The above attributes of a laser or EP printer are examples of electrical signals that can be controlled to cause the printer to operate at a particular power setting, or "EP operating point." As used herein, the EP operating point represents the combination of various attributes and electrical signals that can affect the printer's output darkness. This includes the LASER PWM signal at 64 and the VIDEO signal at 62, described above, which are electrical pulse width modulated signals. This also includes relatively medium to high voltage signals such as the charge roller voltage and developer bias voltage, although in the preferred embodiment these electrical signals are also derived from pulse width modulated signals, and their magnitudes are controlled at the pulse width modulated stage.

In an exemplary Lexmark laser printer, a Toner Darkness setting of eight (8) will control the print engine as follows: the duty cycle of the LASER PWM signal 64 will be 139/255, the slice per pel ratio will be 3/4, the charge roller voltage PWM driver signal will be at 56/63 duty cycle, and the developer bias voltage driver signal will be at 58/63 duty cycle. Each of these control attributes (except for charge roller voltage) would typically be reduced if a lighter print were desired, and each of these attributes (except for charge roller voltage) would typically be increased if a darker print were desired. However, it should be noted that one can only control so far using the slices per pel attribute, since it typically is desirable to not attempt to print only a single slice per pel, and further it is not typically desirable to attempt to print more than six (6) slices per pel when that full pel would otherwise be equivalent to eight (8) slices. It should be noted that a 1200 dpi laser printer will typically control up to four (4) slices for a single pel having a size of $\frac{1}{1200}^{th}$ inch in size.

The main control features described hereinabove include controlling the LASER PWM values that result in the stable DC voltage that drives the laser diode 86, as well as the number of slices for a particular pel that is being printed. The cumulative effect of these two control attributes results in an EP operating point "control level" or "setting" that specifies an adjustment of the energy density at the PC drum 132. Using the control functions discussed above, the energy density for a single pel that is to be printed is proportional to the duty cycle of the LASER PWM signal (which has a precision of 1/256), and the VIDEO signal duration in slices per pel, which is controlled using the ON time of the laser output from laser diode 86 for a particular pel. Other factors that affect the energy density include the optical efficiency of the optics 92, the response time for laser diode 86 as it turns on and off, and also video transmission line effects, which provide a certain attenuation at the frequencies that the VIDEO signal data is provided to the laser driver 84.

In its most general form, energy density at the PC drum 132 is equal to power·time÷area; this translates into light power of the laser beam striking the PC drum, times the amount of time the laser beam is in contact with the PC drum at a pel location (i.e., the number of slices for this pel), divided by the surface area of the PC drum that is being discharged by the laser beam at this pel location.

It should be noted that the LASER PWM duty cycle and the slices per pel attribute are easily controllable by the print engine 36, and these attributes can be adjusted as a control level fairly easily in real time. As noted above, the Toner Darkness setting is typically settable only once per printed page, although that could be changed if desirable. The slices per pel could certainly be changed more often than once per page, although in the control algorithm described hereinabove, this slices per pel attribute only changes when the Toner Darkness setting itself is changed by the user (and this is restricted to occurring only once per page at this time in the preferred embodiment).

In many electrophotographic printers, the printer output darkness changes over the life of the EP process cartridge, even though the Toner Darkness setting has never been changed. One main reason this occurs in some EP printers is because the capacitive outer layer of the PC drum 132 is slowly removed as the cleaner blade 136 scrubs away the toner material that did not adhere to the print media during a printing operation. As this layer becomes thinner, capacitance increases and more toner is required to satisfy field-limited development. When this occurs, more toner per laser spot on the PC drum will develop in response to the same laser exposure.

Another factor in causing the printer output darkness to gradually increase is "work" done on the toner particles, also referred to as "toner wear." As the toner particles are scrubbed by the doctor blade 122 in the developer section of the printer, the toner particles become "damaged" to a certain extent. These toner particles become somewhat fractionalized by the doctor blade, such that the toner particles lose some or all of their additives (known as EPA's, for extra-particulate-additives) and, therefore, the toner tends to become "clumpier" (or more correctly it becomes "agglomerated").

As is well known in the art, the EPA's are designed to increase the toner particle flow as a powder, and without these additives, the toner material will tend to attract to agglomerate. As the toner becomes agglomerated, the toner particles tend to exhibit lower charge per mass; furthermore, smaller, higher charge-to-mass toner particles tend to develop first, thereby leaving behind larger, lower charge-to-mass toner particles. In both situations, more toner is required to satisfy field-limited development. When this occurs, the final result is more toner particles per laser spot of a particular energy density striking the PC drum 132, which results in a darker image on the print media. In summary, toner "wear" includes a change in the average toner particle size, a change in toner flow properties, and/or a change in toner charge properties.

In laser printers that use a cleaner blade on the PC drum, the undesirable effect of PC capacitive layer wear with consequent capacitance increase will occur every time the PC drum is cycled, whether or not a sheet of print media is fed through the print engine 36. In other words, if the laser printer cycles its PC drum upon initialization, or upon a reset, then this effect will occur during those operations. In a Lexmark International, Inc. laser printer, for example, a cycle or partial cycle occurs every time the print engine is warmed up. Moreover, multiple cycles occur prior to and following the cycles associated with imaging.

With regard to "working" the toner particles, when blank sheets of paper are fed through the print engine 36, the toner particles will undergo this "work." In fact, it is probably more desirable to allow some toner to be printed on each sheet of print media that passes through the print engine 36, at least with respect to this "working" effect of the toner. Therefore, the more cycles that the PC drum 132 undergoes without printing any toner at all, the more the toner particles will be "worked" by the doctor blade.

It will be understood that some printers will not exhibit the same type of increase in printer output darkness over the life of an EP process cartridge or over the life of certain components of a print engine within the main body of a printer. However, it will almost always be true that the printer output darkness will be affected in one direction or the other over the life of these components. The principles of the present invention will apply regardless of whether the printer output darkness steadily increases or steadily decreases over the life of the EP process cartridge or other print engine components.

In image forming devices that work on an electrophotographic principle, it is quite likely that the printer output darkness will tend to increase over the life of the internal components. This effect is more pronounced on images that have a relatively low print density, and this can be demonstrated in several different ways. For example, FIGS. 5–8 illustrate graphs of the L* shift over the life of an EP process cartridge with respect to four different attributes. On FIG. 5, the Y-axis is the L* darkness scale and the X-axis is the pel count printed by a particular EP process cartridge. This graph 200 shows two different curves for two different percentages of coverage. The lighter coverage is at 5%, and this is the curve 204. The other curve at 202 illustrates the effect for printing at 25% coverage. As can be seen on FIG. 5, the L* shift is much greater for the lighter percent coverage.

Figure 6:
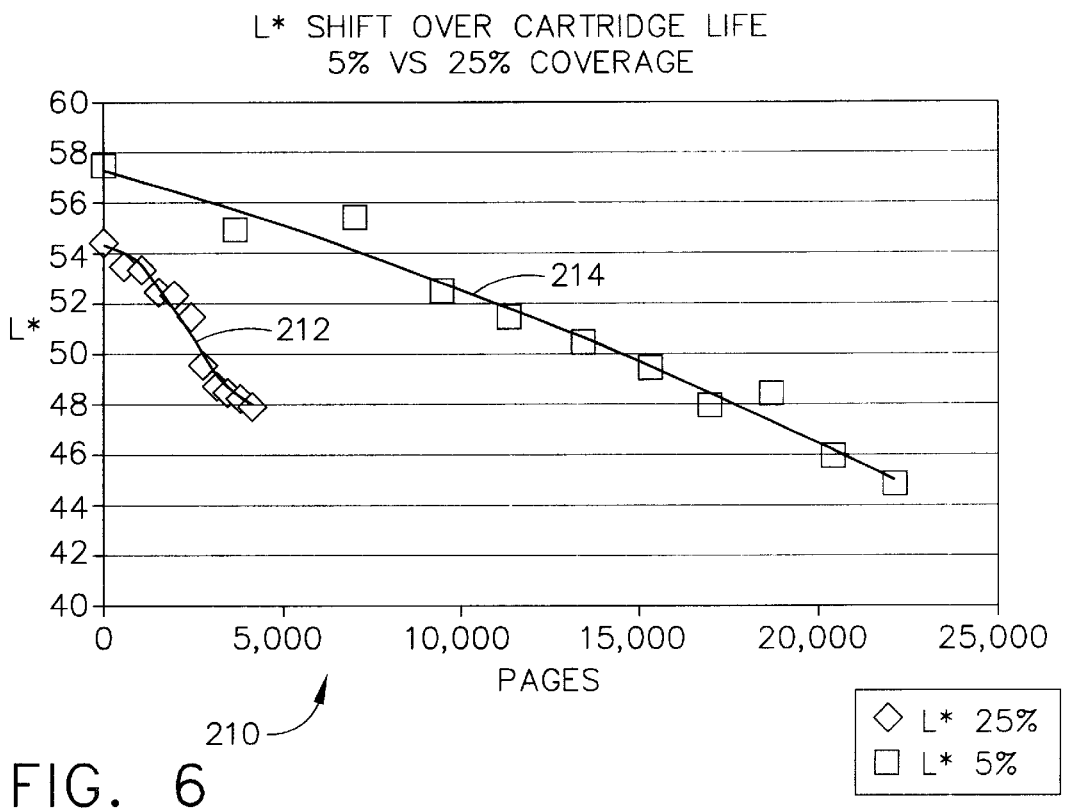
FIG. 6 is a chart of printer output darkness over cartridge life versus number of pages printed.

FIG. 6 shows a graph 210 illustrating the L* shift on the Y-axis versus the number of pages printed along the X-axis. If the percent coverage is 5%, the curve 214 is exhibited, and if the percent coverage is 25%, the curve 212 is exhibited. As would be expected, the number of pages printed at the larger 25% print coverage specification is much fewer than when printing at the 5% coverage specification. However, again it can be seen that the shift in L* is much more pronounced for the lighter print coverage attribute.

Figure 7:
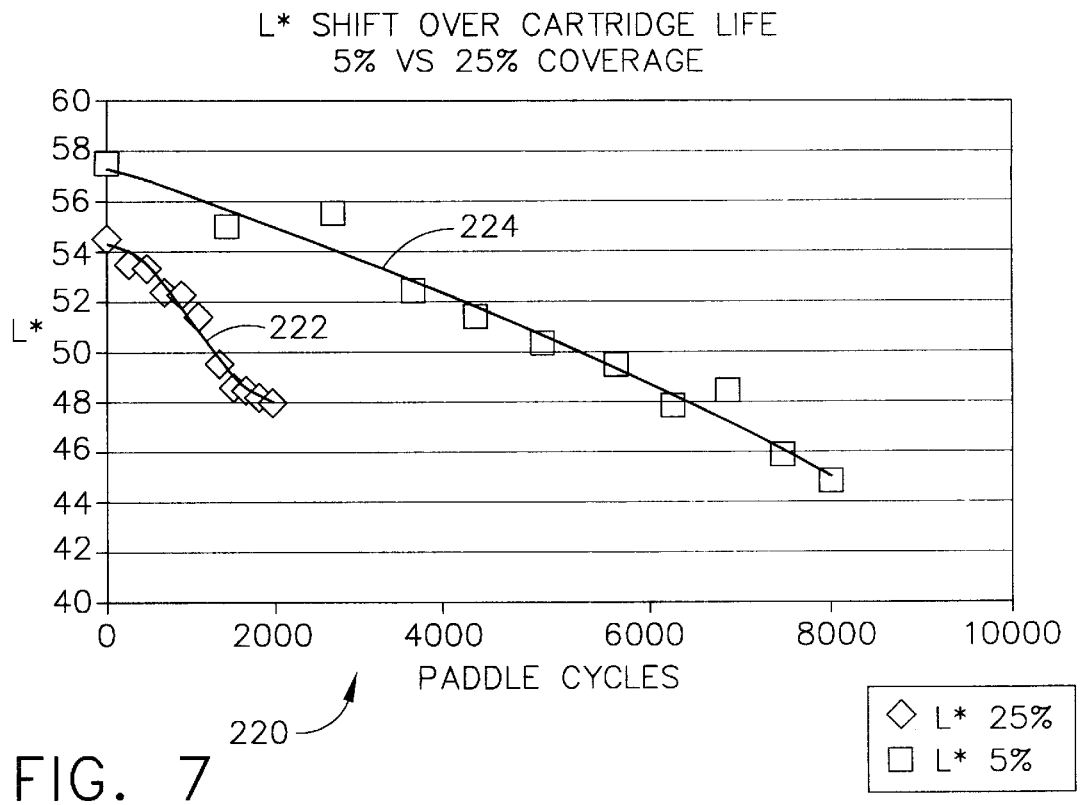
FIG. 7 is a chart of printer output darkness shift over cartridge life versus paddle cycles.

FIG. 7 illustrates a similar graph 220 in which the L* attribute is again along the Y-axis while the number of "paddle" cycles is along the X-axis. The lower coverage curve of 5% coverage is at 224, while the darker coverage (i.e., 25% coverage) is at the curve 222. Again, many fewer paddle cycles occur using the darker coverage before exhausting the toner supply. However, it is again apparent that the total shift in L* is much more pronounced for the lighter coverage attribute. Note that on a Lexmark laser printer, the paddle cycles occur at a slower rate than PC drum cycles.

Figure 8:
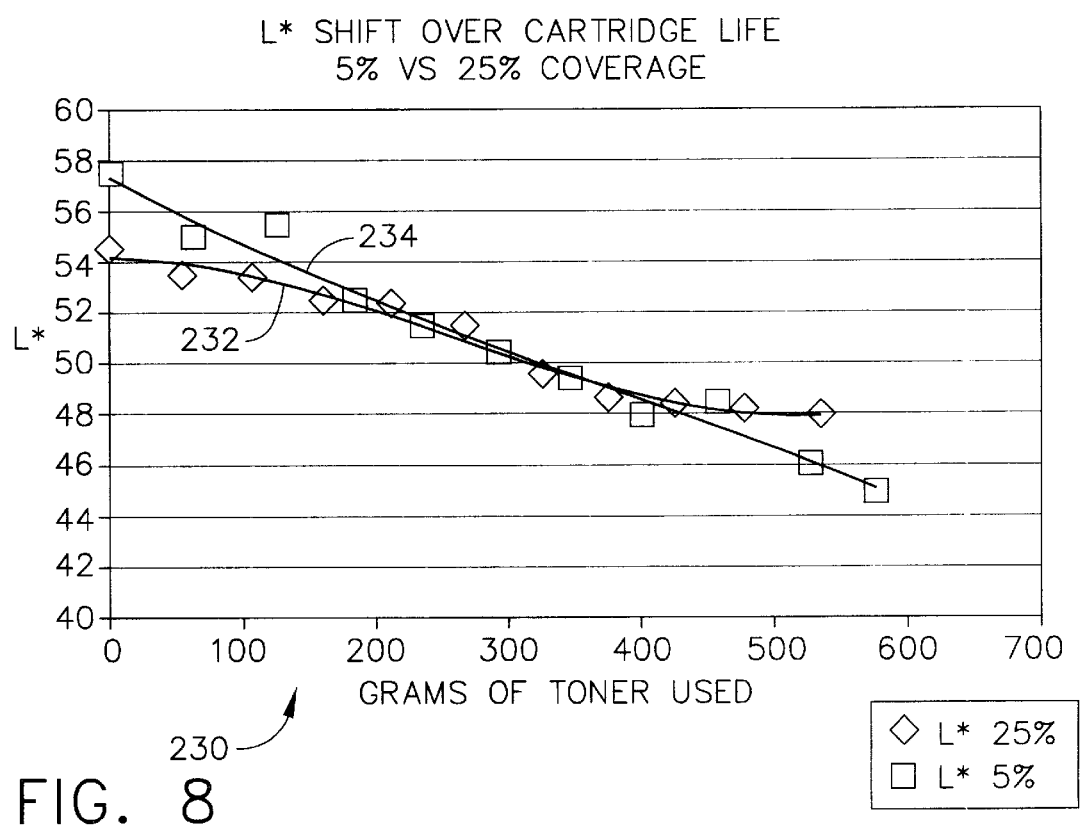
FIG. 8 is a chart of printer output darkness shift over cartridge life versus number of grams of toner used.

FIG. 8 illustrates a graph 230 in which the L* attribute is again along the Y-axis, and the X-axis represents the number of grams of toner that have been consumed. The darker coverage (at 25% coverage) curve is seen at 232, and the lighter percent coverage (at 5% coverage) is seen at 234. Again, it is quite apparent that a much larger shift in L* occurs using the lighter coverage attribute.

Figure 9:
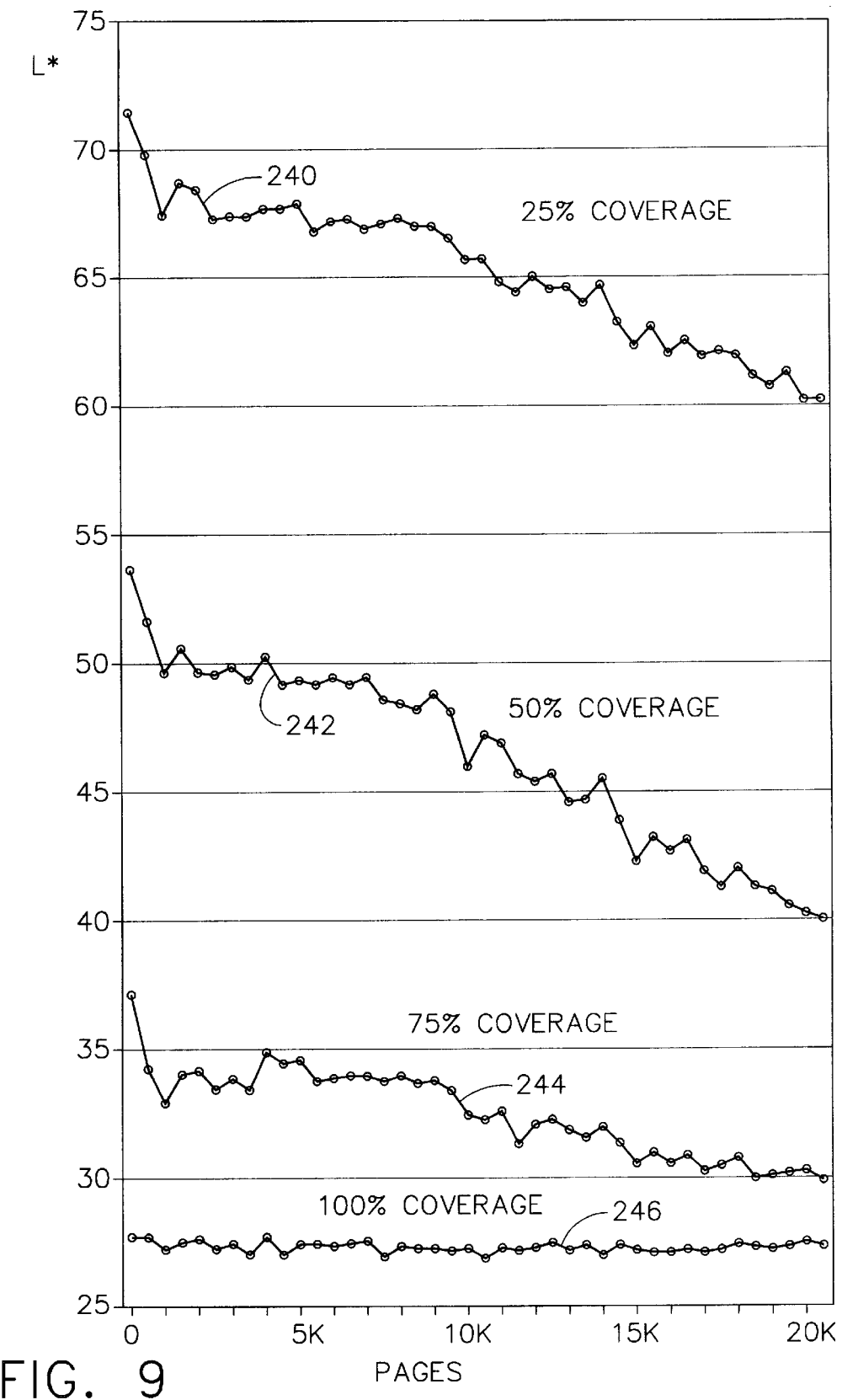
FIG. 9 is a graph showing the printer output darkness shift of cartridge life at different percent coverages versus the number of pages printed.

FIG. 9 graphically illustrates the change in L* printer output darkness over the life of a typical large capacity EP process cartridge, in terms of number of pages printed (along the X-axis). There are four separate curves in FIG. 9, each representing a different percentage of printed coverage over the entire page. The lightest curve at 240 represents 25% coverage, the next darker curve at 242 represents 50% coverage, and the next darkest curve at 244 represents 75% coverage. The darkest curve at 246 represents 100% coverage. It is easy to see that all curves except for the 100% coverage curve 246 will gradually print darker and darker over the number of pages printed by this particular EP process cartridge. It further is easy to see that the lighter curves at 240 and 242 have a much greater shift in L* as compared to the darker curve at 244. This corresponds to the data graphically depicted on FIGS. 5–8.

The numeric data used to create FIG. 9 is provided in a TABLE #2, presented below. In TABLE #2, each new value of L* for a particular percentage coverage represents an incremental 500 pages having been printed. It can be easily tabulated by subtracting the last reading from the initial reading (i.e., at zero pages) that the difference in L* is considerable for the 25% coverage and 50% coverage data. The 100% coverage column only shifts in L* by 0.5, which is to be expected since the printer output darkness shift when printing an entire black page (for a monochrome laser printer) cannot become too much darker, although the toner particles may become "clumpier" and thereby produce a somewhat darker printed image.

TABLE 2

L* OVER CARTRIDGE LIFE

| No. Pages | 25% coverage | 50% coverage | 75% coverage | 100% coverage |
| --- | --- | --- | --- | --- |
| 0 | 71.5 | 53.7 | 37.2 | 27.8 |
| 500 | 69.8 | 51.7 | 34.3 | 27.8 |
| 1000 | 67.4 | 49.7 | 33 | 27.3 |
| 1500 | 68.7 | 50.6 | 34.1 | 27.6 |
| 2000 | 68.4 | 49.7 | 34.2 | 27.7 |
| 2500 | 67.3 | 49.6 | 33.5 | 27.3 |
| 3000 | 67.4 | 49.9 | 33.9 | 27.5 |
| 3500 | 67.4 | 49.4 | 33.5 | 27.1 |
| 4000 | 67.7 | 50.3 | 34.9 | 27.8 |
| 4500 | 67.7 | 49.2 | 34.5 | 27.1 |
| 5000 | 67.9 | 49.4 | 34.6 | 27.5 |
| 5500 | 66.8 | 49.2 | 33.8 | 27.5 |
| 6000 | 67.2 | 49.5 | 33.9 | 27.4 |
| 6500 | 67.3 | 49.2 | 34 | 27.5 |
| 7000 | 66.9 | 49.5 | 34 | 27.6 |
| 7500 | 67.1 | 48.6 | 33.8 | 27 |
| 8000 | 67.3 | 48.5 | 34 | 27.4 |
| 8500 | 67 | 48.2 | 33.7 | 27.3 |
| 9000 | 67 | 48.8 | 33.8 | 27.3 |
| 9500 | 66.5 | 48.1 | 33.4 | 27.2 |
| 10,000 | 65.7 | 46 | 32.5 | 27.3 |
| 10,500 | 65.7 | 47.2 | 32.3 | 26.9 |
| 11,000 | 64.8 | 46.9 | 32.6 | 27.3 |
| 11,500 | 64.4 | 45.7 | 31.4 | 27.2 |
| 12,000 | 65 | 45.4 | 32.1 | 27.3 |
| 12,500 | 64.5 | 45.7 | 32.3 | 27.5 |
| 13,000 | 64.6 | 44.6 | 31.9 | 27.2 |
| 13,500 | 64 | 44.7 | 31.6 | 27.4 |
| 14,000 | 64.7 | 45.5 | 32 | 27 |
| 14,500 | 63.2 | 43.9 | 31.4 | 27.4 |
| 15,000 | 62.3 | 42.3 | 30.6 | 27.2 |
| 15,500 | 63 | 43.2 | 31 | 27.1 |
| 16,000 | 62 | 42.7 | 30.6 | 27.1 |
| 16,500 | 62.5 | 43.1 | 30.9 | 27.2 |
| 17,000 | 61.9 | 41.9 | 30.3 | 27.1 |
| 17,500 | 62.1 | 41.3 | 30.5 | 27.2 |
| 18,000 | 61.9 | 42 | 30.8 | 27.4 |
| 18,500 | 61.1 | 41.3 | 30 | 27.3 |
| 19,000 | 60.7 | 41.1 | 30.1 | 27.2 |
| 19,500 | 61.3 | 40.5 | 30.2 | 27.3 |

TABLE 2-continued

L* OVER CARTRIDGE LIFE

| No. Pages | 25% coverage | 50% coverage | 75% coverage | 100% coverage |
|---|---|---|---|---|
| 20,000 | 60.1 | 40.2 | 30.3 | 27.5 |
| 20,500 | 60.2 | 40 | 29.9 | 27.3 |

The principle purpose of the present invention is to correct for a shift in printer output darkness over the life of an EP process cartridge, or over the life of some other component of the print engine that resides within the printer's main body. In the case of a process cartridge, the toner material being "worked" due to print engine cycles is a primary factor in the printer output darkness becoming greater over the life of the cartridge, and the increase in PC drum capacitance is another primary factor.

In view of this information, the present invention adjusts the EP operating point after a predetermined amount of usage of the EP process cartridge, which may include adjustments to the effective laser power settings. The metric that is used to determine when an adjustment should be made could be based on several different factors, including pel count, number of pages printed, grams of toner consumed from the process cartridge, and operational cycles of the print engine. The operational cycles specification could be based on various components within the print engine, including the rotation of the PC drum, developer roller, charge roller, or, in the case of a Lexmark laser printer, the rotation of the toner paddle wheel 116. Moreover, a combination of more than one of these metrics could be utilized, such as pel count and grams of toner consumed, or number of pages printed and number of cycles of a print engine component.

As an example, the Lexmark laser printers manufactured at this time use a "toner gas gauge" that physically measures the remaining quantity of toner material within the toner reservoir. In a larger capacity EP process cartridge, this toner gas gauge does not begin providing bucket level gradation changes until less than half of the toner material remains within a 600 gram cartridge. Therefore, this direct measurement of grams of toner consumed would not be appropriate by itself, and preferably would be combined with the number of pels printed, for example, to provide an appropriate metric for adjusting the print engine characteristics that affect the printer output darkness during the earlier stages of process cartridge usage. The details of using the toner gas gauge are provided in U.S. Pat. No. 5,995,774, Ser. No. 09/152,241, titled "METHOD AND APPARATUS FOR STORING DATA IN A NON-VOLATILE MEMORY CIRCUIT MOUNTED ON A PRINTER'S PROCESS CARTRIDGE," and assigned to Lexmark International, Inc., which is incorporated herein by reference in its entirety.

Of course, the toner gas gauge itself could be redesigned so that the bucket level gradations begin to appear much earlier during the life of the cartridge. Or another alternative would be to design a different type of toner sensor that can provide more readings at earlier intervals during the life of an EP process cartridge.

Figure 10:
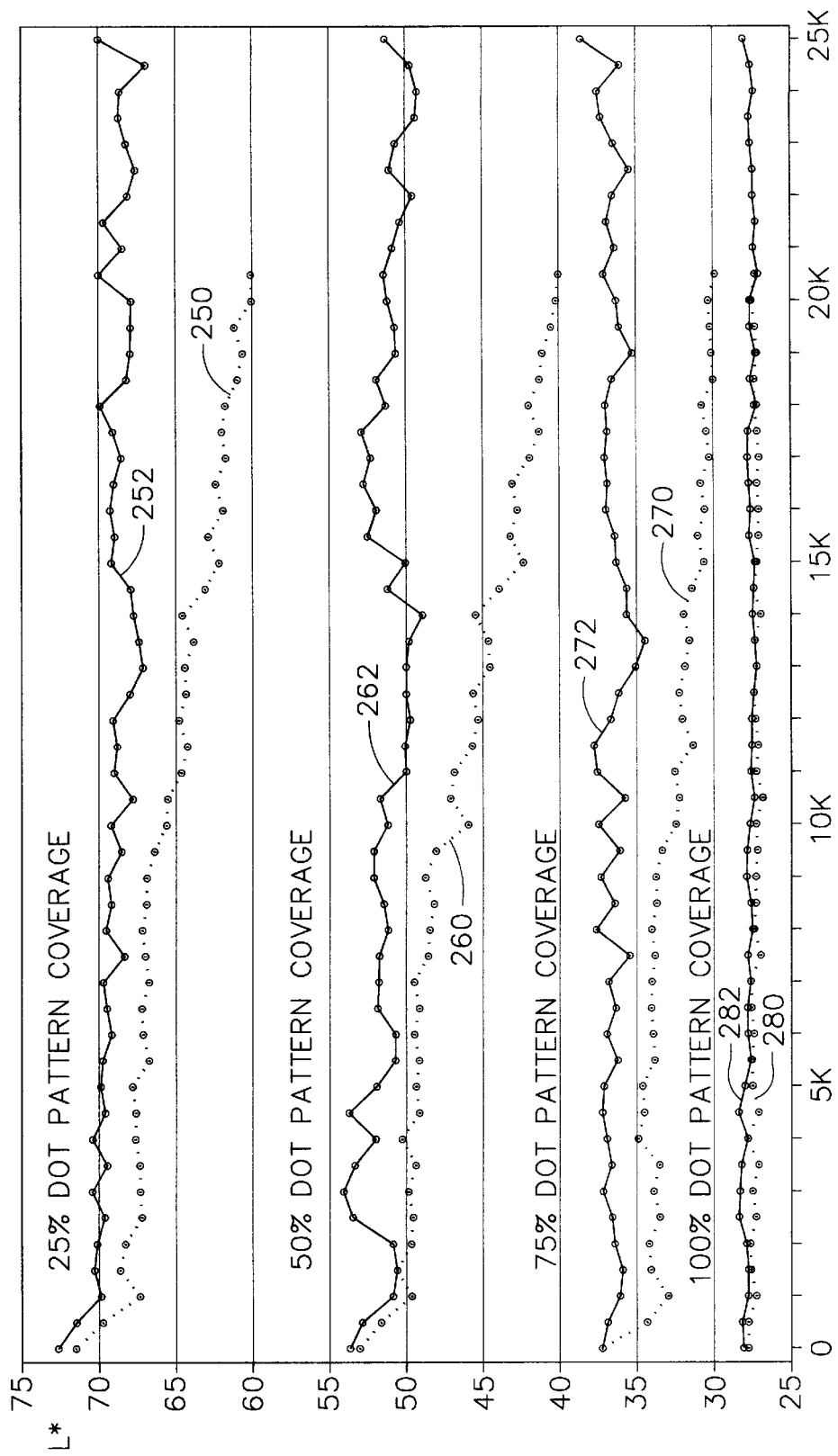
FIG. 10 is a chart of printer output darkness shift over cartridge life of corrected and uncorrected print engines, at different percent coverages versus number of pages printed.

FIG. 10 is a graph that illustrates the effect of correcting the printer output darkness at various usage intervals during the life of an EP process cartridge. On FIG. 10 the Y-axis represents L*, while the X-axis represents the number of pages printed. There are four pairs of curves, each representing a different percentage of coverage, and each pair of curves includes an "uncorrected" printer output darkness life history versus a "corrected" printer output darkness life history. For example, using a 25% dot pattern coverage, the curve 250 is an uncorrected printer output darkness indication, and it can be seen that the printer output darkness over the life of the cartridge changes by about twelve L* values. The corresponding corrected curve is indicated at 252, in which corrections were made at approximately every five hundred pages of cartridge usage. Of course, the actual printer output darkness could be controlled to an even finer extent, if desirable.

A 50% dot pattern coverage pair of curves is provided at 260 for the uncorrected curve and at 262 for the corrected curve. Again, the printer output darkness shifted by over thirteen L* values for the uncorrected curve 260 during the life of this cartridge.

A 75% dot pattern coverage set of curves is provided at 270 for the uncorrected curve and at 272 for the corrected curve. Finally, a 100% dot pattern coverage pair of curves is illustrated at 280 for the uncorrected curve and at 282 for the corrected curve. There is not much difference between these last two curves, although the corrected curve 282 was able to print far more pages since it used less toner material in view of the adjustments to its operating parameters affecting printer output darkness. In fact, it can be seen that each of the corrected curves provided more printed pages in view of the same factors, as compared to their corresponding uncorrected curves.

In order to perform the printer output darkness correction, the printer must adjust the operating parameters that affect printer output darkness at certain intervals of usage of the system components. As discussed hereinabove, the metric used to make determinations concerning adjustment decisions could be one of several different factors, or a combination of those factors. Some of these factors involve the: (1) pel count, (2) pages printed, (3) operating cycles of one of the components of the print engine, or (4) grams of toner consumed. The physical adjustments that can be made to electrical signals in a laser printer as described in FIG. 4 include changing: (1) the LASER PWM signal that consequently determines the drive voltage used by the laser driver 84 to provide drive current through the laser diode 86, (2) the number of slices per pel in the VIDEO signal at 62, (3) the charge roller voltage, and/or (4) the developer bias voltage. Any one of these factors can affect the printer output darkness.

Figure 11:
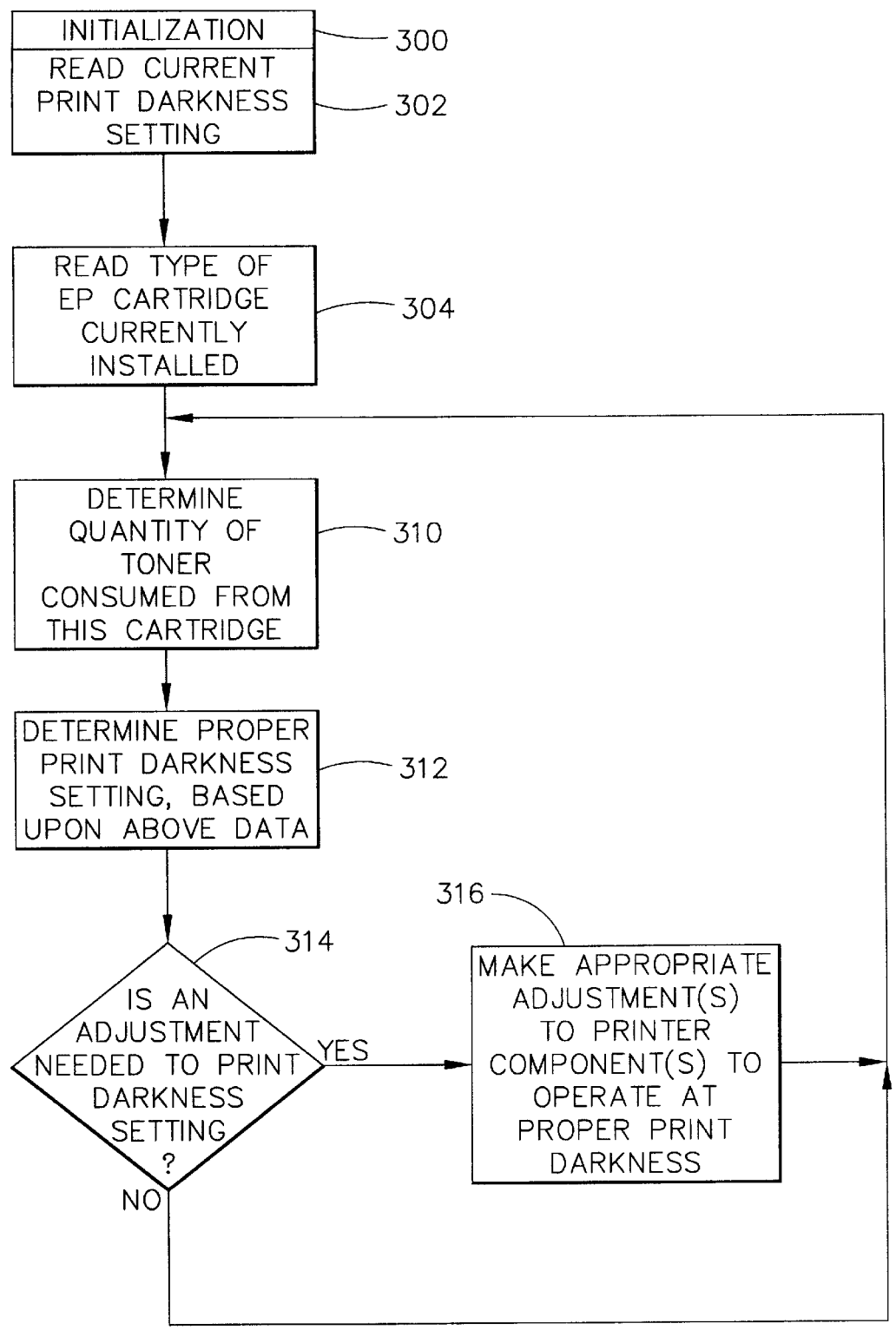
FIG. 11 is a flow chart showing some of the important logic functions that are performed by the present invention.

On FIG. 11, a flow chart is provided illustrating the important logical decisions that are made to adjust the printer output darkness with respect to the present invention. Starting at an initialization step 300, the first function to be performed is to read the current printer output darkness setting at a step 302. This is information that could be stored at any number of locations within the printer 10, including any of the non-volatile memory elements of this printer. For example, this information could be stored in the printer main body at, for example, its NVRAM 26, its Flash memory 52, or even a hard disk drive 50. Alternatively, these operating parameters could be stored in the print engine 36, within its memory elements 42. The non-volatile portion of the print engine's memory elements 42 could include NVRAM or Flash memory. Moreover, it could be that standard Random Access Memory provided for the print engine in its ASIC 44 could contain these parameters after they have been downloaded from the printer main body (also referred to herein as the RIP 150). Finally, these operating parameters could be stored in a non-volatile memory 144 of the EP process cartridge 100. This information could be stored in an EEPROM 148 of the memory 144 on the EP process cartridge 100. For this information, it would be preferred to use a type of memory that could be written to multiple times, rather than the write once/read often memory provided by an EPROM at 146.

Once the current printer output darkness setting has been determined at step 302, the printer will now inspect the EP process cartridge that is currently installed at a step 304 to determine exactly what type of EP process cartridge is currently mated to the printer main body. This type of information will preferably be stored in a non-volatile memory that cannot be changed by a user, such as the EPROM 146 on the EP process cartridge 100. This type of information could also be stored in a pure Read Only Memory (ROM)-type device on the EP process cartridge, although that would require a separate type of memory element as compared to the recommended EPROM and EEPROM memory elements already discussed. The precise type of EP process cartridge currently installed could be very important to the operational settings that involve the print engine for a particular printer output darkness level. A particular laser printer could, over its entire life span, be compatible with several different types of EP process cartridges that are developed during this life span. This could mean more than one type of black toner cartridge for a monochrome laser printer, for example, or also could be for more than one type of color cartridge for a color laser printer.

Once the specific type of EP process cartridge has been determined at step 304, a step 310 now determines the quantity of toner that has been consumed from this EP cartridge. Using this metric, the amount of toner material that was provided with this particular EP process cartridge would be known by the printer after step 304 has been executed. For example, a 25,000 page EP process cartridge at 5% coverage would contain approximately 600 grams of toner. By using some type of toner sensor that can determine the remaining quantity of toner within the EP process cartridge, a simple subtraction will provide the desired "toner consumed" quantity that would be utilized by this particular metric. It will be understood that other metrics could be used in lieu of using the toner consumed metric without departing from the principles of the present invention. Other metrics can readily be used, such as the cycle count of a particular component of the print engine, a pel count that has been printed from this cartridge, and/or the number of pages that have been printed by this cartridge.

Once the quantity of toner that has been consumed from the particular EP process cartridge mated to this printer has been determined, a step 312 now determines the proper printer output darkness setting. As discussed above, laser printers manufactured by Lexmark International, Inc. have a capability by which the user can select the Toner Darkness attribute, by use of a numeric scale from 1–10, whereby 10 is the maximum Toner Darkness setting. The present invention will inspect the Toner Darkness setting, which will either be the "default" setting, or the Toner Darkness setting that has been previously selected by a user. In either situation, the printer output darkness is to be adjusted at certain toner usage intervals in order to correct the actual printer output darkness of the print output being produced on the print media, thereby correcting the printer output darkness shift that otherwise would occur. The chart illustrated in FIG. 12 provides further information on this point, and will be discussed in greater detail hereinbelow.

Once the proper printer output darkness setting has been determined, a decision step 314 determines if an adjustment is presently needed to the printer output darkness setting by comparing the current proper setting to the value found at step 302, or to a later updated value. If the answer is NO, then the logic flow is directed back to step 310 where the quantity of toner that has been consumed from this EP process cartridge is determined.

On the other hand, if the result of decision step 314 is YES, then a step 316 will make an appropriate adjustment to one or more printer components to cause the printer to operate at the proper printer output darkness to correct for the darkness shift that otherwise would occur after so much usage of the EP process cartridge has occurred. The actual operating point that will be determined and the appropriate adjustment made at step 316 will depend upon the current user-inputted Toner Darkness setting. Of course, if a particular laser printer does not allow the user to manually set the printer output darkness level, then the appropriate adjustment based upon the usage of a particular EP process cartridge will always be the same, since the printer will always be running on its default printer output darkness setting.

Figure 12:
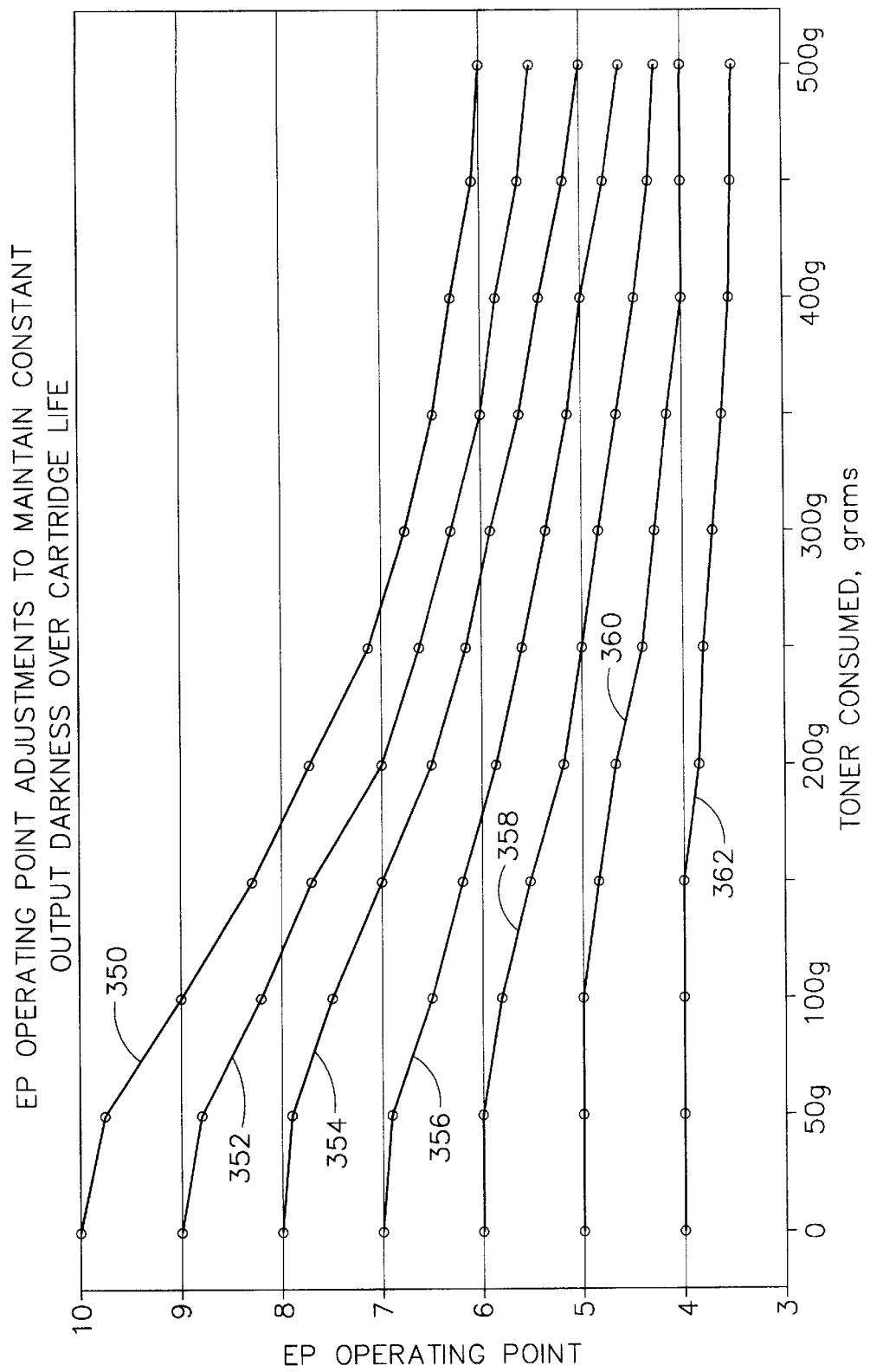
FIG. 12 is a chart showing adjustments to the EP operating point used to maintain a substantially constant printer output darkness level versus the number of grams of toner consumed, including the use of different user settings of the Toner Darkness attribute.

FIG. 12 is a graph of adjustments to the EP operating point that preferably are made to correct the printer output darkness level based upon the amount of toner consumed in a particular EP process cartridge. The chart of FIG. 12 depicts the EP operating point in numeric form along the Y-axis, using the user-settable Toner Darkness attribute of a Lexmark laser printer as the initial basis for this EP operating point setting. In addition, the grams of toner consumed are depicted along the X-axis. As discussed above, the "darkest" Toner Darkness level that can be selected in such a Lexmark laser printer is equal to "10," and the "lightest" Toner Darkness level is equal to "1."

The chart of FIG. 12 shows values along the Y-axis in the range of only 3–10, because on certain types of laser printer and EP process cartridge combinations, the printer output darkness did not substantially change for EP operating point settings in the range of 1–3. Therefore, when the printer is operated at a Toner Darkness setting in this 1–3 range, no significant correction would be necessary over the life of the EP process cartridge.

With regard to the other EP operating point settings in the range of 4–10, it is preferred to make adjustments to the EP operating point by varying at least one electrical parameter of the print engine. The EP operating point physically represents a combination of electrical signals, such as the laser power signal (e.g., the LASER PWM signal 64), laser duty cycle signal (e.g., the VIDEO signal 62), the charge roller voltage, and the developer bias voltage. There is an EP operating point value associated with each user-settable Toner Darkness setting at the beginning of cartridge life, as illustrated in Table #3, below.

The darker the user-settable Toner Darkness setting (e.g., at level 10), the more adjustment is necessary to maintain a constant printer output darkness over the life of the EP process cartridge. This is reflected in curve 350, for example, in which the EP operating point starts at ten (10), and by the time 500 grams of toner have been consumed, the EP operating point required to maintain constant output darkness is reduced, as seen in Table #3 where the effective EP operating point is depicted at a value of six (6). This information is numerically tabulated in TABLE #3, which is provided below.

In TABLE #3, the precise numeric settings for the power or energy levels that make up the effective EP operating point settings is provided for each of the curves on FIG. 12. Each one of these curves on FIG. 12 starts at an integer EP operating point value (which matches up to one of the possible Toner Darkness levels that can be selected by a user). Upon the consumption of 50 grams of toner, a new effective EP operating point value is calculated and utilized as an adjustment. Naturally, the adjustment of a new effective EP operating point could occur more often than every 50 grams of toner, if desired.

TABLE #3

ADJUSTED EP OPERATING POINT OVER CARTRIDGE LIFE

| Toner grams used | Toner Darkness Setting | | | | | | |
|---|---|---|---|---|---|---|---|
| | 10 | 9 | 8 | 7 | 6 | 5 | 4 |
| 0 | 10 | 9 | 8 | 7 | 6 | 5 | 4 |
| 50 | 9.75 | 8.8 | 7.91 | 6.91 | 6 | 5 | 4 |
| 100 | 9 | 8.21 | 7.5 | 6.5 | 5.8 | 5 | 4 |
| 150 | 8.29 | 7.7 | 7 | 6.18 | 5.52 | 4.82 | 4 |
| 200 | 7.72 | 7 | 6.5 | 5.84 | 5.18 | 4.65 | 3.85 |
| 250 | 7.13 | 6.62 | 6.15 | 5.6 | 5 | 4.41 | 3.8 |
| 300 | 6.75 | 6.3 | 5.9 | 5.35 | 4.82 | 4.25 | 3.7 |
| 350 | 6.47 | 6 | 5.6 | 5.12 | 4.63 | 4.12 | 3.6 |
| 400 | 6.28 | 5.84 | 5.4 | 5 | 4.46 | 4 | 3.53 |
| 450 | 6.07 | 5.62 | 5.18 | 4.76 | 4.31 | 4 | 3.5 |
| 500 | 6 | 5.5 | 5 | 4.6 | 4.25 | 4 | 3.5 |

On FIG. 12, the printer output darkness level curves for the various print printer output darkness levels are as follows: curve 350 for level 10, curve 352 for level 9, curve 354 for level 8, curve 356 for level 7, curve 358 for level 6, curve 360 for level 5, and curve 362 for level 4. It can be seen that the lighter printer output darkness setting of four (4) on curve 362 requires a change in the EP operating point from level 4 down to a value of 3.5 after 500 grams of toner have been consumed.

TABLE #4 is provided below to illustrate actual operational data for a laser printer manufactured by Lexmark International, Inc. that utilizes the principles of the present invention. TABLE #4 is based upon the data depicted on FIG. 12 and in TABLE #3. In TABLE #4, the left-hand column is the grams of toner that have been consumed by this EP process cartridge.

The next column from the left shows the attribute settings for laser power when the EP operating point is set to ten (10). For example, at zero grams of toner consumed (i.e., when the EP process cartridge is new), the numeric data provided in TABLE #4 reads as follows: "203 3-56-58." These numbers represent the following: "203" is the duty cycle in units of 1/255 of the LASER PWM signal 64 that drives the analog multiplexer 70, so in this case, the duty cycle is 203/255. The numeral "3" represents the number of slices per pel, for a 1200 dpi printer in which there are a total of four (4) slices per pel. In other words, at this setting there would be 3/4 slices per pel, thereby providing a 75% duty cycle of the VIDEO signal 62 driving laser driver 84.

The numeral "56" represents the developer bias voltage pulse width modulated signal, in units of 1/63, and at this value there would be a duty cycle of 56/63 of the maximum developer bias voltage. The final numeral "58" represents the charge roller voltage, again in terms of a pulse width modulated signal in 1/63, and in this circumstance the duty cycle would be 58/63 of the maximum charge roller voltage.

Two more examples will illustrate some important points about TABLE #4. At an initial Toner Darkness setting of 10 and at 300 grams of toner consumed, the values are shown as, "109 3-56-58." The first two numbers represent the laser power duty cycle of 109/255, and the slices per pel of 3/4. However, the next reading at 350 grams of toner consumed changes the slices per pel attribute to 2/4. In this instance, the duty cycle of the laser power must increase to accommodate the significant decrease in slices per pel. Therefore, the numeric data for 350 grams of toner consumed is as follows: "163 2-56-58." This provides an effective EP operating point of 6.47, whereas the effective EP operating point at 300 grams consumed was 6.75 (see TABLE #3).

When using tabulated operational data to control printer output darkness such as depicted in TABLE #4, in one control scheme, periodic adjustments could be made upon given intervals of cartridge usage (such as an additional 50 grams of toner consumed). This would lead to a step-like function that makes a relatively coarse adjustment to the operating parameters affecting printer output darkness upon reaching these given intervals.

In another control scheme, the tabulated data of TABLE #4 could be stored in the printer (or the process cartridge), and periodic adjustments to the operating parameters affecting printer output darkness could be made on a virtually continuous basis, thereby providing the EP operating point adjustment curves as depicted as segmented lines in FIG. 12.

TABLE #4

ADJUSTED EP OPERATING POINT OVER CARTRIDGE LIFE

| Toner grams used | Toner Darkness Setting | | | | | | |
|---|---|---|---|---|---|---|---|
| | 10 | 9 | 8 | 7 | 6 | 5 | 4 |
| 0 | 203 3-56-58 | 165 3-56-58 | 139 3-56-58 | 115 3-56-58 | 152 2-55-57 | 132 2-55-57 | 115 2-55-57 |
| 50 | 193 3-56-58 | 160 3-56-58 | 136 3-56-58 | 113 3-56-58 | 152 2-55-57 | 132 2-55-57 | 115 2-55-57 |
| 100 | 165 3-56-58 | 144 3-56-58 | 127 3-56-58 | 103 3-56-58 | 148 2-55-57 | 132 2-55-57 | 115 2-55-57 |
| 150 | 155 3-56-58 | 132 3-56-58 | 115 3-56-58 | 90 3-56-58 | 142 2-55-57 | 129 2-55-57 | 115 2-55-57 |
| 200 | 132 3-56-58 | 115 3-56-58 | 103 3-56-58 | 149 2-55-57 | 136 2-55-57 | 126 2-55-57 | 112 2-55-57 |
| 250 | 118 3-56-58 | 100 3-56-58 | 156 2-55-57 | 146 2-55-57 | 133 2-55-57 | 122 2-55-57 | 109 2-55-57 |
| 300 | 109 3-56-58 | 158 2-55-57 | 152 2-55-57 | 141 2-55-57 | 128 2-55-57 | 119 2-55-57 | 106 2-55-57 |
| 350 | 163 2-56-58 | 152 2-56-58 | 146 2-55-57 | 135 2-55-57 | 125 2-55-57 | 117 2-55-57 | 103 2-55-57 |
| 400 | 158 2-56-58 | 150 2-55-57 | 142 2-55-57 | 132 2-55-57 | 122 2-55-57 | 115 2-55-57 | 101 2-55-57 |
| 450 | 154 2-56-58 | 148 2-56-58 | 136 2-55-57 | 128 2-55-57 | 120 2-55-57 | 115 2-55-57 | 100 2-55-57 |
| 500 | 152 2-56-58 | 142 2-56-58 | 132 2-55-57 | 124 2-55-57 | 119 2-55-57 | 115 2-55-57 | 100 2-55-57 |

In this control scheme, the operating parameters affecting printer output darkness would be precisely known only at the periodic control points (such as exactly at the points where an additional 50 grams of toner have been consumed), and at all usage points therebetween, an interpolated value for the EP operating point will be calculated. This control step corresponds to the flow chart step 312 on FIG. 11.

In the preferred embodiment, interpolated values for charge roller voltage and developer bias voltage attributes are obtained by use of linear interpolation. Laser power (i.e., LASER PWM) preferably is interpolated, rather than the granular duty cycle value in slices/pel of the VIDEO signal, so as to obtain intermediate laser exposure values (which create the energy density at the PC drum or other type of photoreceptor) between specified EP operating point settings.

While the slices per pel parameter can be quickly and easily modified (by use of the VIDEO signal 62), the effect of making a change to its duty cycle is rather drastic, since its precision is quite low. In a 600 dpi printer available at the present time, this precision is only one part in eight (1/8 resolution). In a 1200 dpi printer available at the present time, the precision may be only one part in four (1/4 resolution). In the system described above, this is the most coarse (or most granular) of all operating parameters. However, in combination with the laser power (LASER PWM) signal, the slices per pel parameter can provide a wide control range for adjusting the printer output darkness over the life of a print engine component, and the overall precision would be that of the 8-bit LASER PWM signal.

It will be understood that significantly different duty cycle parameters affecting energy density at the PC drum, and that significantly different developer bias voltages and charge roller voltages could be used, for different types of EP printers or EP copiers without departing from the principles of the present invention. It will also be understood that different styles of EP printers use different types of replaceable cartridges; some EP printers or EP copiers use "process cartridges" as described hereinabove that contain various components in addition to toner, other EP printers or EP copiers use toner cartridges that contain toner material only, and some EP printers or EP copiers also use separate developer cartridges.

The physical implementation of printer output darkness adjustments could be made in more than one form. For example, the tabular data as depicted in TABLE #4, above, could be placed in a non-volatile memory component as a look-up table. Every time that step 312 on FIG. 11 is executed, the look-up table would be inspected, starting at the quantity of toner consumed attribute. Once this attribute is located in the look-up table, the operating parameters would be found, and these operating parameters would be output to their respective physical devices for adjusting (or maintaining) the actual printer output darkness. Of course, the user-inputted Toner Darkness setting would have to be taken into account, but this would be a known value in the look-up table. The look-up table could have a value specified for each of the physical parameters that are to be affected. This could include all of the electrical signals and voltage values described hereinabove, i.e., (1) laser diode drive current—as controlled by the LASER PWM signal 64; (2) slices per pel—as controlled by the VIDEO signal 62; (3) charge roller voltage, and (4) developer bias voltage. Other physical attributes could also be manipulated, if desired, that may have an effect on printer output darkness, including attributes that are found in laser printers of a different design provided by manufacturers other than Lexmark International, Inc.

As an alternative, the tabular data in TABLE #4 could be quantified as a transfer function that describes, for example, printer output darkness vs. quantity of toner consumed. Instead of a look-up table, the proper printer output darkness setting would be determined by placing the present values of toner consumption and the user-inputted Toner Darkness setting into an appropriate transfer function equation, which would provide a resulting value for each of the physical parameters that are to be affected. This could include all of the electrical signals and voltage values described hereinabove, i.e., (1) laser diode drive current—as controlled by the LASER PWM signal 64; (2) slices per pel—as controlled by the VIDEO signal 62; (3) charge roller voltage, and (4) developer bias voltage. Other physical attributes could also be manipulated, if desired, that may have an effect on printer output darkness, including attributes that are found in laser printers of a different design provided by manufacturers other than Lexmark International, Inc.

The use of a transfer function may have certain advantages in memory storage efficiency. For example, a particular style of laser printer may be able to operate with several different styles of toner cartridge or EP process cartridge (such as cartridge 100). These different cartridges may contain various types of toner material (e.g., one having magnetic toner additives or non-magnetic toner additives) or merely contain different quantities of toner. In any event, the attribute affecting printer output darkness settings will likely be different for each style of cartridge, and the printer will preferably know how to deal with all known compatible cartridges. This could be handled by use of individual look-up tables stored in the printer's non-volatile memory (such as ROM 32, NVRAM 26, Flash memory 52, hard disk drive 50, and/or the print engine memory 42), or it could be handled by use of individual transfer functions that are stored in those same memory elements as equations, which would require very little space in memory.

If the look-up tables or transfer functions are stored in the printer's ROM, then no further modifications to that data could ever be made. However, if instead the look-up tables or transfer functions are stored in the printer's writeable non-volatile memory elements (such as NVRAM, Flash memory, or hard disk drive), then these the look-up tables or transfer functions could be later modified to either make corrections (if ever needed), or to add further EP process cartridge styles to the list of compatible cartridges that may be mated to the printer main body.

It may also be desirable to store certain information in the memory elements of an EP process cartridge relating to the printer output darkness settings. It certainly would be desirable to store information pertaining to the actual usage history of the particular EP process cartridge, such as the number of pels or pages printed, or the number of cycles of a component within an EP process cartridge. If the memory on the EP process cartridge can be written to many times (such as an EEPROM chip used as either NVRAM or as Flash memory), then the exact cartridge usage can be stored at relatively frequent intervals, such as after each page has been passed through the print engine. In this circumstance, the cumulative page count could be stored, or number of process cycles. Furthermore, the number of pels printed could be frequently stored, including variations on the theme: for instance, the "raw" pel count could be stored, and in addition a weighted pel count based upon various operating parameters could be stored. This weighted pel count could take into account factors such as Toner Darkness settings, pel frequency (which is pattern dependent in a sequence), environmental conditions (such as temperature and humidity), and remaining toner in the cartridge.

If the memory provided on the EP process cartridge can be written to only one time (such as an EPROM chip), then the cartridge usage history can still be stored, but at less frequent intervals. For example, if printer output darkness correction is to take place at toner usage intervals of 50 grams, then a bit could be burned in the EPROM memory chip on the EP process cartridge at 50 gram intervals. Or perhaps a greater precision could be tracked in this situation, and a bit could be burned in the EPROM memory chip on the EP process cartridge at, for example, 10 gram intervals. Even at this "greater" precision, a 600 gram EP process cartridge would only need to utilize 60 bits of memory space in the EPROM chip, which would only require eight bytes of space (assuming 8-bit bytes) to store this important attribute of cartridge usage.

In any of the above examples, if the usage history is stored within the EP process cartridge memory, then the usage history of the cartridge will follow that cartridge regardless of whether the cartridge is frequently removed from a particular printer (and perhaps even used in other printers), or whether the cartridge spends its entire life mated to a single printer, and is never removed until its toner supply expires. Of course, the printer main body can also track the usage history of a mated EP process cartridge, and could even track multiple such cartridges. For example, the printer main body could maintain several cartridge serial numbers within its rather sizable memory capabilities (i.e., sizable at least with respect to a memory chip that would typically be found on an EP process cartridge or a toner cartridge, which likely would be a very inexpensive component), and similarly track usage history data for each of these several cartridges.

The discussion immediately above describes the cartridge usage history as being based upon toner consumption of the cartridge. Of course, other parameters could be used, as discussed hereinabove at other locations. For example, the page count, pel count, or a cycle count are also useful indicators of cartridge use, and any one of these (or a combination thereof) could be used to first track cartridge history, and then to make determinations about adjustments to physical components that can be controlled to correct the effective printer output darkness over the life of the cartridge. It will be understood that other parameters than those discussed above may be used to provide printer output darkness correction without departing from the principles of the present invention. For example, the page count could be a reliable indicator of EP cartridge usage, and the use of page count as a metric illustrated in FIGS. 9 and 10, in which a corrected printer output darkness was demonstrated on FIG. 10 by adjusting the print engine components at 500-page intervals.

Moreover, it will be understood that the usage history of the printer main body itself could also be used as a factor in adjusting the printer output darkness. For example, if the charge roller is not replaced as part of an EP process cartridge replacement, then the charge roller's gradual degradation will likely affect printer output darkness, and this could occur over the life of many different EP process cartridges. Therefore, the control over the charge roller voltage could be additionally corrected over the life of the printer main body, within the scope of the present invention.

While the embodiments discussed hereinabove are directly applicable to a monochromatic printer, the principles of the present invention are equally applicable to a color printer, including a color laser printer. In a color laser printer each color cartridge is treated independently for life considerations, just as in the case of a monochrome cartridge. Adjustments are made to the EP operating point for each color cartridge based upon toner consumption, or based upon another life metric, so as to maintain approximately constant L* over the life of that replaceable color cartridge.

In a color laser printer, it will be understood that the principles of the present invention will apply regardless of the actual construction of the individual color components. In other words, the physical construction of the color print engines and their toner cartridges may vary from one color laser printer design to the next, but each such color laser printer will be improved if the EP operating point for each color cartridge is adjusted according to the present invention to maintain a "constant" L* for that individual color.

As an example, in a preferred color laser printer developed by Lexmark International, Inc., there are four (4) different print engines—one for cyan, magenta, yellow, and black ("CMYK") colors, and each of these four print engines has an individual color process cartridge that contains color toner along with a PC drum; and further each color process cartridge is replaceable as a unitary sub-assembly. In this arrangement, each color print engine has its own laser light source, optics, developer section, and PC drum, and each of these color print engines can adjust the EP operating point attributes of laser power, laser duty cycle (in slices per pel), charge roller voltage, and developer bias voltage.

Alternatively, a different color laser printer design may use mere "toner cartridges" for each color, in which the replaceable cartridge contains only toner (and does not contain a new PC drum or other major print engine component). In this situation, this different color laser printer would still have an individual print engine per color, with its own laser light source, optics, developer section, and PC drum, for example; however, none of these major components would necessarily be replaced along with a new supply of toner. Another alternative configuration is a color laser printer that is designed to have its PC drum and developer section replaced at every second toner cartridge replacement (such as the case in the OPTRA C 1200, manufactured by Lexmark International, Inc.) The present invention will adequately enhance all of these different types of color laser printers by adjusting one or more of the EP operating point attributes listed above.

It is also possible to design a color laser printer that shares certain print engine components between more than one color print engine. For example, a single polygonal mirror could be used with multiple laser light sources (e.g., laser diodes) such that there are three or four output laser beams from the single mirror representing bitmap information for three or four different colors. In this arrangement there would still be an individual supply of color toner for each color that can be printed by this design of color laser printer, and that toner supply could be provided in the form of a mere "toner cartridge," or as a "process cartridge" that additionally contains other print engine components, such as a PC drum. The EP operating point attributes can still be adjusted in this design of color laser printer according to the principles of the present invention, and they could be individually adjustable for the different colors. For example, the EP operating point attributes of charge roller voltage and developer bias voltage could still be individually adjustable for the different colors, especially if there is a separate PC drum and developer section for each color.

Another color laser printer design that shares certain print engine components between more than one print engine is where a single laser light source provides a laser beam to a photoconductive drum or a photoconductive belt that is shared among three or four toner-developer cartridges with image accumulation on an intermediate transfer member (e.g., a belt or drum), and subsequent transfer of the accumulated image to the print media. In this situation there again would be an individual supply of color toner for each color that can be printed by this design of color laser printer, and that toner supply could be provided in the form of a mere "toner cartridge," or as a "process cartridge" that additionally contains developer roller and associated metering, doctoring and charging components. The EP operating point attributes can still be adjusted in this design of color laser printer according to the principles of the present invention. The EP operating point attributes of laser power and laser duty cycle (in slices per pel) would be individually adjustable for the different colors in time coordination with imaging for that toner color. The EP operating point attributes of charge roller voltage and developer bias voltage would also be individually adjustable for the different colors.

It will be understood that the principles of the present invention will apply to all color printers regardless of the number of colors that can be printed, or the exact color wavelengths that can be printed, by a particular color printer. For example, a four-color printer would typically use CMYK colors (for cyan, magenta, yellow, and black), whereas a three-color printer would typically use CMY colors (for cyan, magenta, yellow, but not black). In addition, a three-color or four-color printer may not use the CMY process colors of cyan, magenta, and yellow, but instead may use red, green, and blue (RGB). The present invention can be used to automatically compensate any of these color printers to maintain its L* for each printed color.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for compensating for printed output darkness shift of an image forming apparatus, said method comprising:
   (a) providing an electrophotographic print engine having an electromagnetic energy source and a photoreceptor, said electrophotographic print engine exhibiting an initial printer output darkness;
   (b) determining a control level corresponding to an initial EP operating point resulting from at least one of: (i) an energy density provided at said photoreceptor by said electromagnetic energy source, and (ii) at least one attribute of a component within said electrophotographic print engine; and
   (c) periodically adjusting said control level after a predetermined quantity of usage of at least one component of said electrophotographic print engine, said periodic adjustment being made to automatically increase or decrease said EP operating point so as to substantially maintain the printer output darkness at its initial value.

2. The method as recited in claim 1, wherein said at least one component of said electrophotographic print engine comprises a component of a replaceable electrophotographic process cartridge.

3. The method as recited in claim 2, wherein said replaceable electrophotographic process cartridge, during its use, tends to gradually increase its printer output darkness, and said periodic adjustment being made to said EP operating point is for the purpose of reducing the darkness of said printer output.

4. The method as recited in claim 2, wherein said replaceable electrophotographic process cartridge, during its use, tends to gradually decrease its printer output darkness, and said periodic adjustment being made to said EP operating point is for the purpose of increasing the darkness of said printer output.

5. The method as recited in claim 3, wherein said periodic adjustment of the control level provides a greater number of pages to be printed by said electrophotographic print engine for a constant toner load of one of: (a) a replaceable electrophotographic process cartridge, or (b) a replaceable toner cartridge.

6. The method as recited in claim 3, wherein the printer output darkness of said replaceable electrophotographic process cartridge is affected by at least one of: (a) a varying thickness of a chargeable insulating material at a surface of said photoreceptor, and (b) wear of toner particles at a developer stage of said electrophotographic print engine.

7. The method as recited in claim 3, further comprising one of: (a) varying a drive current of a laser diode to effectuate said periodic adjustment, or (b) varying a duty cycle of a laser diode for each pel to be printed to effectuate said periodic adjustment, thereby affecting the energy density of an electromagnetic energy beam striking said photoreceptor;
   wherein the laser diode acts as said electromagnetic energy source; and wherein said electromagnetic energy beam is produced by said laser diode.

8. The method as recited in claim 7, wherein said drive current is controlled by an analog voltage that is derived from a pulse width modulated signal through an integrator/filter circuit.

9. The method as recited in claim 7, wherein said periodic adjustment is based upon values stored in a look-up table, said values being used to adjust said control level upon reaching said predetermined quantity of usage.

10. The method as recited in claim 7, wherein said periodic adjustment is based upon values stored in a look-up table; and further comprising using interpolation between said values to adjust said control level at times other than upon reaching said predetermined quantity of usage.

11. The method as recited in claim 7, wherein said periodic adjustment is based upon values calculated by a transfer function, said values being used to adjust said control level at all times.

12. The method as recited in claim 7, wherein said periodic adjustment is based upon values stored in a look-up table or values calculated by a transfer function, said values being stored in a memory element in one of: (a) a main body of said image forming apparatus, (b) said electrophotographic print engine, or (c) a replaceable electrophotographic process cartridge.

13. The method as recited in claim 12, further comprising burning a bit in a write once-read often memory element of said replaceable electrophotographic process cartridge after a predetermined quantity of usage of said at least one component of the electrophotographic print engine.

14. The method as recited in claim 1, wherein said at least one component of said electrophotographic print engine comprises an attribute of a main body portion of said image forming apparatus.

15. The method as recited in claim 14, wherein said attribute comprises one of a charge roller voltage, or a developer bias voltage.

16. The method as recited in claim 15, further comprising: varying one of said charge roller voltage or said developer bias voltage to effectuate said periodic adjustment.

17. The method as recited in claim 1, wherein said predetermined quantity of usage is based upon one of: (a) accumulated number of pels printed, (b) accumulated number of pages printed, (c) accumulated number of cycles of a component of said electrophotographic print engine, or (d) quantity of toner consumed.

18. The method as recited in claim 17, wherein
   (a) said component of said electrophotographic print engine comprises one of: (i) a component contained within a replaceable electrophotographic process cartridge, or (ii) a component contained within a main body of said image forming apparatus; and
   (b) wherein said predetermined quantity of usage is based upon one of: (i) a usage history of an attribute pertaining to said replaceable electrophotographic process cartridge, or (ii) a usage history of an attribute pertaining to said main body of said image forming apparatus.

19. The method as recited in claim 1, wherein said initial printer output darkness is variable as per a Toner Darkness user selectable value, and said periodic adjustment of the control level is made to automatically increase or decrease said EP operating point so as to substantially maintain the printer output darkness at an initial value with respect to the Toner Darkness setting previously entered by a user.

20. A method for compensating for printed output darkness shift of an image forming apparatus, said method comprising:
   (a) providing an electrophotographic print engine having an electromagnetic energy source and a photoreceptor, said electrophotographic print engine exhibiting an initial printer output darkness on a print media at an initial EP operating point resulting from at least one of: (i) an energy density provided at said photoreceptor by said electromagnetic energy source, and (ii) at least one attribute of a component within said electrophotographic print engine;
   (b) periodically adjusting said EP operating point after a predetermined quantity of usage of at least one component of said electrophotographic print engine to substantially maintain said printer output darkness on the print media at its initial value.

21. The method as recited in claim 20, wherein said initial printer output darkness on said print media is variable as per a Toner Darkness user selectable value, and said periodic adjustment of the EP operating point substantially maintains the printer output darkness at its initial value with respect to the Toner Darkness setting previously entered by a user.

22. The method as recited in claim 20, wherein said at least one component of said electrophotographic print engine comprises a component of a replaceable electrophotographic process cartridge, and said replaceable electrophotographic process cartridge, during its use, tends to gradually increase its printer output darkness, and said periodic adjustment being made to said EP operating point is for the purpose of reducing the darkness of said printer output.

23. The method as recited in claim 22, wherein said periodic adjustment of the EP operating point provides a greater number of pages to be printed by said electrophotographic print engine for a constant toner load of one of: (a) a replaceable electrophotographic process cartridge, or (b) a replaceable toner cartridge.

24. The method as recited in claim 20, wherein said at least one component of said electrophotographic print engine comprises one of a charge roller voltage, or a developer bias voltage, and further comprising: varying one of said charge roller voltage or said developer bias voltage to effectuate said periodic adjustment.

25. The method as recited in claim 1, wherein said predetermined quantity of usage is based upon one of: (a) accumulated number of pels printed, (b) accumulated number of pages printed, (c) accumulated number of cycles of a component of said electrophotographic print engine, or (d) quantity of toner consumed.

26. The method as recited in claim 25, wherein
   (a) said at least one component of said electrophotographic print engine comprises one of: (i) a component contained within a replaceable electrophotographic process cartridge, or (ii) a component contained within a main body of said image forming apparatus; and
   (b) wherein said predetermined quantity of usage is based upon one of: (i) a usage history of an attribute pertaining to said replaceable electrophotographic process cartridge, or (ii) a usage history of an attribute pertaining to said main body of said image forming apparatus.

27. An image forming apparatus, comprising:
   a memory circuit for storage of data, an electrophotographic print engine having an electromagnetic energy source and a photoreceptor, and a processing circuit that is configured to control an EP operating point resulting from at least one of: (a) an energy density provided at said photoreceptor by said electromagnetic energy source, and (b) at least one attribute of a component within said electrophotographic print engine;
   said electrophotographic print engine exhibiting an initial printer output darkness on a print media; and
   said processing circuit also being configured to periodically adjust said EP operating point after a predetermined quantity of usage of at least one component of said electrophotographic print engine so as to substantially maintain the printer output darkness on said print media at its initial value over at least one of said predetermined quantity of usage.

28. The image forming apparatus as recited in claim 27, wherein the printer output darkness of said replaceable electrophotographic process cartridge is affected by at least one of: (a) a varying thickness of a chargeable insulating material at a surface of said photoreceptor, and (b) wear of toner particles at a developer stage of said electrophotographic print engine.

29. The image forming apparatus as recited in claim 27, wherein said processing circuit is further configured to: (a) vary a drive current of a laser diode to effectuate said periodic adjustment, or (b) vary a duty cycle of a laser diode for each pel to be printed to effectuate said periodic adjustment, or (c) both vary a drive current of a laser diode to effectuate said periodic adjustment and vary a duty cycle of a laser diode for each pel to be printed to effectuate said periodic adjustment; wherein the laser diode acts as said electromagnetic energy source.

30. The image forming apparatus as recited in claim 29, wherein said drive current is controlled by an analog voltage that is derived from a pulse width modulated signal through an integrator/filter circuit.

31. The image forming apparatus as recited in claim 29, wherein said periodic adjustment is based upon values stored in a look-up table, said values being used to adjust said EP operating point upon reaching said predetermined quantity of usage.

32. The image forming apparatus as recited in claim 29, wherein said periodic adjustment is based upon values stored in a look-up table; and further comprising using interpolation between said values to adjust said EP operating point at times other than upon reaching said predetermined quantity of usage.

33. The image forming apparatus as recited in claim 29, wherein said periodic adjustment is based upon values calculated by a transfer function, said values being used to adjust said EP operating point at all times.

34. The image forming apparatus as recited in claim 29, wherein said periodic adjustment is based upon values stored in a look-up table or values calculated by a transfer function, said values being stored in a memory element in one of: (a) a main body of said image forming apparatus, (b) said electrophotographic print engine, or (c) a replaceable electrophotographic process cartridge.

35. The image forming apparatus as recited in claim 34, wherein said processing circuit is yet further configured to burn a bit in a write once-read often memory element of said replaceable electrophotographic process cartridge after a predetermined quantity of usage of said at least one component of the electrophotographic print engine.

36. The image forming apparatus as recited in claim 27, wherein said at least one component of said electrophotographic print engine comprises one of a charge roller voltage, or a developer bias voltage.

37. The image forming apparatus as recited in claim 36, wherein said processing circuit is further configured to vary one of said charge roller voltage or said developer bias voltage to effectuate said periodic adjustment.

38. The image forming apparatus as recited in claim 27, wherein said predetermined quantity of usage is based upon one of: (a) accumulated number of pels printed, (b) accumulated number of pages printed, (c) accumulated number of cycles of a component of said electrophotographic print engine, or (d) quantity of toner consumed.

39. The image forming apparatus as recited in claim 27, wherein said initial printer output darkness on said print media is variable as per a Toner Darkness user selectable value, and said periodic adjustment of the EP operating point substantially maintains the printer output darkness at its initial value with respect to the Toner Darkness setting previously entered by a user.

40. The image forming apparatus as recited in claim 27, further comprising a second electrophotographic print engine that prints a different color than the first electrophotographic print engine, wherein:

said processing circuit is further configured to control a second EP operating point of said second electrophotographic print engine;

said second electrophotographic print engine exhibiting a second initial printer output darkness on said print media; and said processing circuit also being configured to periodically adjust said second EP operating point after a predetermined quantity of usage of at least one component of said second electrophotographic print engine so as to substantially maintain the second printer output darkness on said print media at its second initial value over at least one of said predetermined quantity of usage.

41. The image forming apparatus as recited in claim 40, wherein said second electrophotographic print engine shares said photoreceptor with said first electrophotographic print engine.

42. The image forming apparatus as recited in claim 40, wherein said second electrophotographic print engine includes a second photoreceptor that is separate from said photoreceptor of said first electrophotographic print engine.

* * * * *